(12) United States Patent
Alexandre et al.

(10) Patent No.: US 11,996,237 B2
(45) Date of Patent: May 28, 2024

(54) MULTIPOLE ELECTROMAGNET

(71) Applicant: SYNCHROTRON SOLEIL, Saint-Aubin (FR)

(72) Inventors: Patrick Alexandre, Le Chesnay Rocquencourt (FR); Rachid Ben El Fekih, Massy (FR)

(73) Assignee: SYNCHROTRON SOLEIL, Saint-Aubin (FR)

( * ) Notice: Subject to any disclaimer, the term of this patent is extended or adjusted under 35 U.S.C. 154(b) by 0 days.

(21) Appl. No.: 18/245,209

(22) PCT Filed: May 13, 2022

(86) PCT No.: PCT/EP2022/063074
§ 371 (c)(1),
(2) Date: Mar. 14, 2023

(87) PCT Pub. No.: WO2022/243200
PCT Pub. Date: Nov. 24, 2022

(65) Prior Publication Data
US 2024/0055170 A1    Feb. 15, 2024

(30) Foreign Application Priority Data

May 18, 2021   (FR) ..................................... 2105166

(51) Int. Cl.
 *H01F 7/20*   (2006.01)
 *H05H 7/04*   (2006.01)
 *H05H 13/04*  (2006.01)
(52) U.S. Cl.
 CPC .............. *H01F 7/202* (2013.01); *H05H 7/04* (2013.01); *H05H 13/04* (2013.01); *H05H 2007/045* (2013.01)

(58) Field of Classification Search
None
See application file for complete search history.

(56) References Cited

U.S. PATENT DOCUMENTS 3,387,241 A * 6/1968 Audoin ................. G21K 1/093
  335/211
3,569,791 A * 3/1971 Vogel ..................... H01F 7/204
  322/8

(Continued)

OTHER PUBLICATIONS

English Translation of Written Opinion received for PCT/EP2022/063074, dated Sep. 16, 2022.

(Continued)

*Primary Examiner* — Srinivas Sathiraju
(74) *Attorney, Agent, or Firm* — Greer, Burns & Crain, Ltd

(57) ABSTRACT

A multipole electromagnet for injecting particles, including a hollow duct extending along a longitudinal axis, and a plurality of wire conductors that are placed parallel or substantially parallel to the longitudinal axis along the duct, electrically connected in series and arranged to conduct electric current. The directions of the electric current flowing through the wire conductors are symmetric about a first plane of symmetry. The wire conductors are distributed in multiple carrier planes that are parallel or substantially parallel to the first plane of symmetry, including two main carrier planes that are symmetric about the first plane of symmetry and located outside the hollow, each main carrier plane carrying wire conductors that conduct the electric current in the first direction and wire conductors that conduct the electric current in the second direction opposite the first direction.

19 Claims, 11 Drawing Sheets

(56) References Cited

U.S. PATENT DOCUMENTS

| | | | | |
|---|---|---|---|---|
| 3,671,787 | A * | 6/1972 | Herron | H02K 1/17 310/154.11 |
| 3,708,246 | A * | 1/1973 | Radchenko | H01F 30/12 310/11 |
| 4,160,935 | A * | 7/1979 | Groot | H01J 29/826 313/425 |
| 4,631,743 | A * | 12/1986 | Tomimasu | H01J 35/00 315/501 |
| 4,933,638 | A * | 6/1990 | Kleinberg | G01R 33/3808 324/303 |
| 4,962,309 | A * | 10/1990 | White, III | G21K 1/093 250/397 |
| 5,055,788 | A * | 10/1991 | Kleinberg | G01R 33/3808 324/303 |
| 5,117,194 | A | 5/1992 | Nakanishi et al. | |
| 5,216,377 | A * | 6/1993 | Nakata | H05H 7/04 315/501 |
| 5,355,106 | A * | 10/1994 | Nakata | H05H 7/04 335/212 |
| 5,363,008 | A * | 11/1994 | Hiramoto | H05H 13/00 315/504 |
| 5,393,255 | A * | 2/1995 | Hisaoka | H01J 9/42 445/63 |
| 5,523,824 | A * | 6/1996 | Sahay | G03G 21/0047 118/623 |
| 5,739,724 | A * | 4/1998 | Alexandre | B06B 1/0253 318/116 |
| 5,783,914 | A * | 7/1998 | Hiramoto | H05H 7/10 315/504 |
| 5,969,367 | A * | 10/1999 | Hiramoto | A61N 5/1042 315/501 |
| 6,241,383 | B1 * | 6/2001 | Feller | G01K 7/16 374/E7.018 |
| 6,537,245 | B1 * | 3/2003 | Alexandre | F42B 3/117 604/145 |
| 8,525,449 | B2 * | 9/2013 | Torikai | H05H 13/04 315/504 |
| 2002/0183689 | A1 * | 12/2002 | Alexandre | A61M 5/3015 604/69 |
| 2003/0014006 | A1 * | 1/2003 | Alexandre | A61M 5/484 604/68 |
| 2003/0050596 | A1 * | 3/2003 | Alexandre | A61M 5/30 604/69 |
| 2003/0097093 | A1 * | 5/2003 | Navelier | A61M 5/30 604/68 |
| 2006/0089595 | A1 * | 4/2006 | Alexandre | A61M 5/30 604/69 |
| 2006/0247573 | A1 * | 11/2006 | Alexandre | A61M 5/30 604/69 |
| 2007/0167906 | A1 * | 7/2007 | Alexandre | A61M 5/3007 604/68 |
| 2007/0276321 | A1 * | 11/2007 | Alexandre | A61M 5/30 604/69 |
| 2008/0039780 | A1 * | 2/2008 | Alexandre | A61M 5/30 604/68 |
| 2008/0048493 | A1 * | 2/2008 | Grundl | B60T 13/686 303/145 |
| 2008/0281144 | A1 * | 11/2008 | Cameron | A61B 90/00 600/12 |
| 2009/0072164 | A1 * | 3/2009 | Ogata | H01J 37/3171 250/492.21 |
| 2009/0326446 | A1 * | 12/2009 | Alexandre | A61M 5/30 604/69 |
| 2010/0076375 | A1 * | 3/2010 | Alexandre | A61M 5/30 604/69 |
| 2010/0201183 | A1 * | 8/2010 | Gruendl | B60T 13/662 303/11 |
| 2010/0213384 | A1 * | 8/2010 | Furukawa | G21K 1/093 250/396 ML |
| 2012/0200237 | A1 * | 8/2012 | Torikai | H05H 7/10 315/503 |
| 2015/0065597 | A1 * | 3/2015 | Furuyama | B29C 67/20 521/182 |
| 2015/0337679 | A1 * | 11/2015 | Everwyn | F02C 7/047 415/118 |
| 2016/0289402 | A1 * | 10/2016 | Furuyama | C08J 7/123 |
| 2016/0304679 | A1 * | 10/2016 | Furuyama | C08J 5/18 |
| 2016/0330827 | A1 * | 11/2016 | Sugahara | H05H 13/04 |
| 2017/0046886 | A1 * | 2/2017 | Everwyn | G08B 21/182 |
| 2017/0301504 | A1 * | 10/2017 | Burke | H01J 35/1024 |
| 2017/0319873 | A1 * | 11/2017 | Boisseau | A61N 5/1067 |
| 2018/0058973 | A1 * | 3/2018 | Everwyn | B64F 5/60 |
| 2018/0111007 | A1 * | 4/2018 | Gordon | A61N 5/1067 |
| 2019/0231981 | A1 * | 8/2019 | Auriel | A61M 5/3007 |
| 2020/0105493 | A1 * | 4/2020 | Robinson | H01J 35/1017 |
| 2020/0105494 | A1 * | 4/2020 | Bostrom | A61B 6/035 |
| 2020/0105495 | A1 * | 4/2020 | Robinson | F16C 35/12 |
| 2020/0298022 | A1 * | 9/2020 | Gordon | A61N 5/103 |
| 2022/0204189 | A1 * | 6/2022 | Jawad | H01F 7/0226 |
| 2023/0209696 | A1 * | 6/2023 | Mizushima | H05H 7/04 315/503 |

OTHER PUBLICATIONS

International Search Report and Written Opinion received for PCT/EP2022/063074, dated Sep. 16, 2022.
French Search Report received for Application No. 2105166, dated Dec. 21, 2021.
Alexandre, P., et al., "Transparent Top-up Injection into a Fourth-generation Storage Ring," Nuclear Inst. and Methods in Physics Research, A 986, 2021, 164739, 11 pages.
Atkinson, T., et al., "Development of a Non-Linear Kicker System to Facilitate a New Injection Scheme for the Bessy II Storage Ring," Proceedings of IPAC2011, San Sebastian, Spain, THPO024, T16 Pulsed Power Technology, 2011, pp. 3394-3396.
Sun, C., et al., "Optimizations of Nonlinear Kicker Injection for Synchrotron Light Sources," Physical Review Accelerators adn Beams 23, 2020, pp. 010702-1 to 010702-10.

* cited by examiner

[Fig. 1]
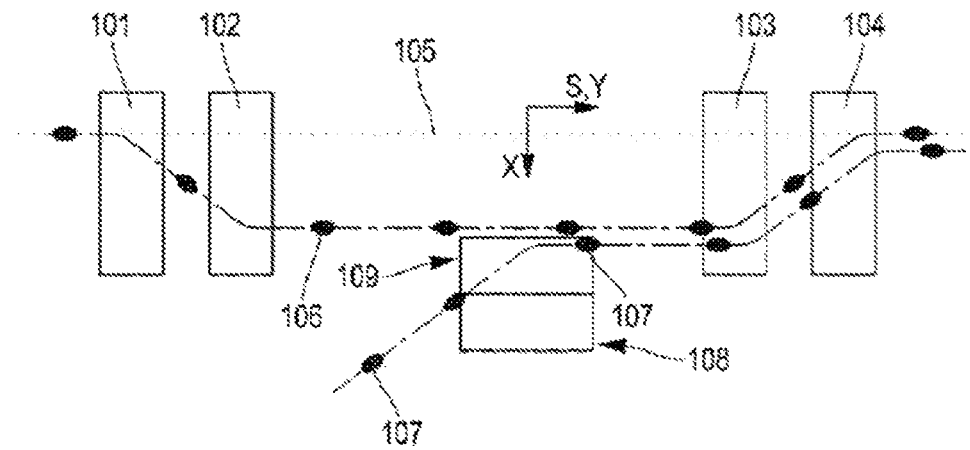
Prior art
[Fig. 2]
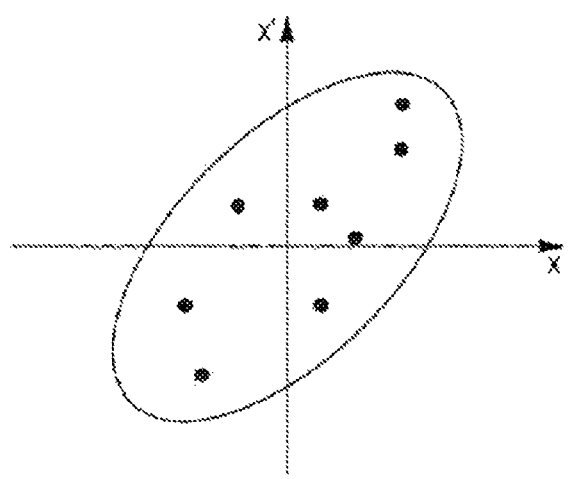
Prior art

[Fig. 3]
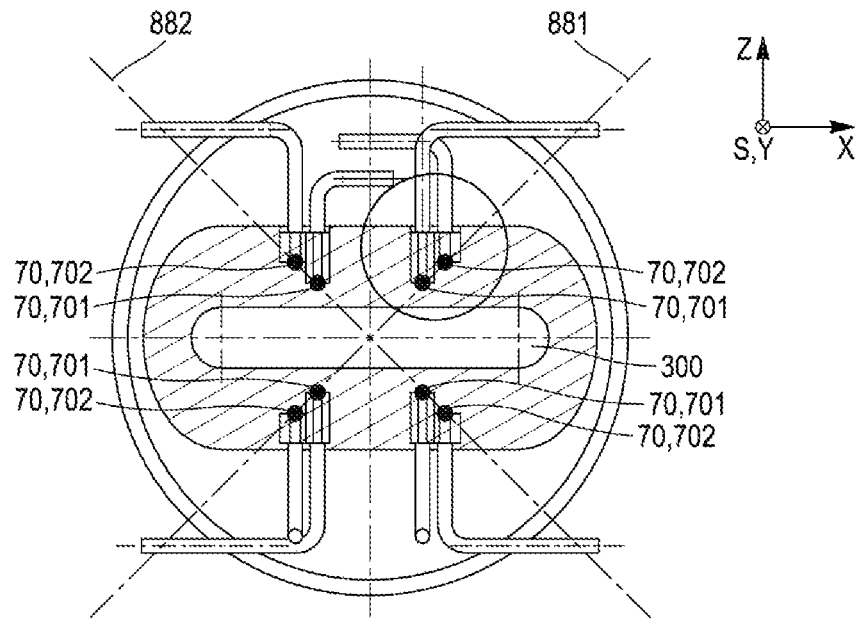
Prior Art
[Fig. 4]
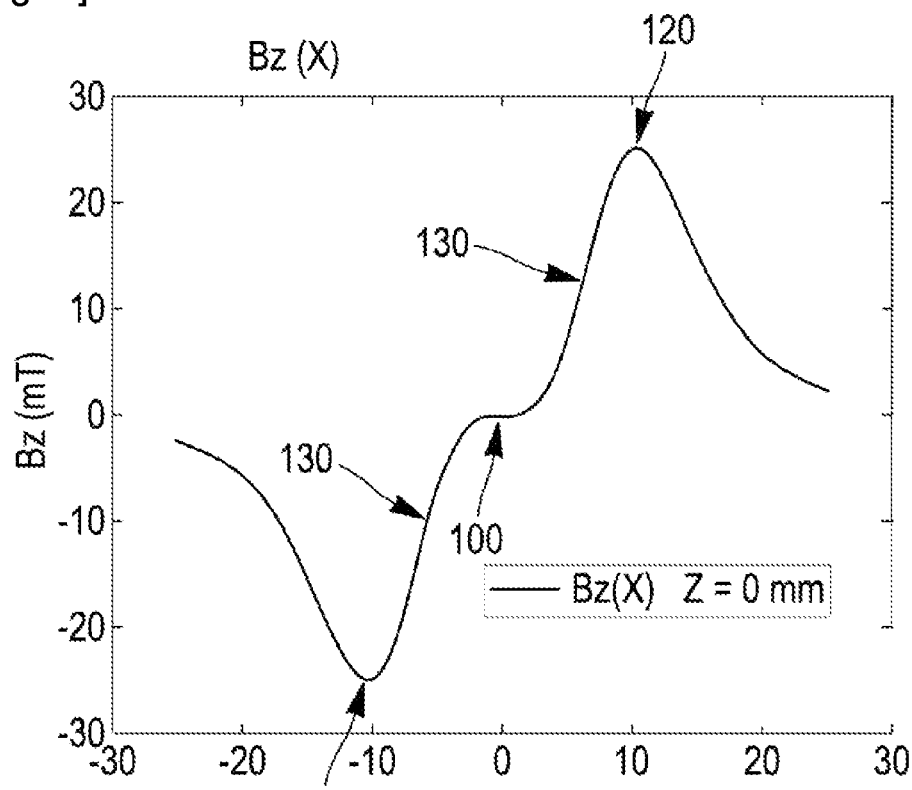
Prior Art

[Fig. 5]
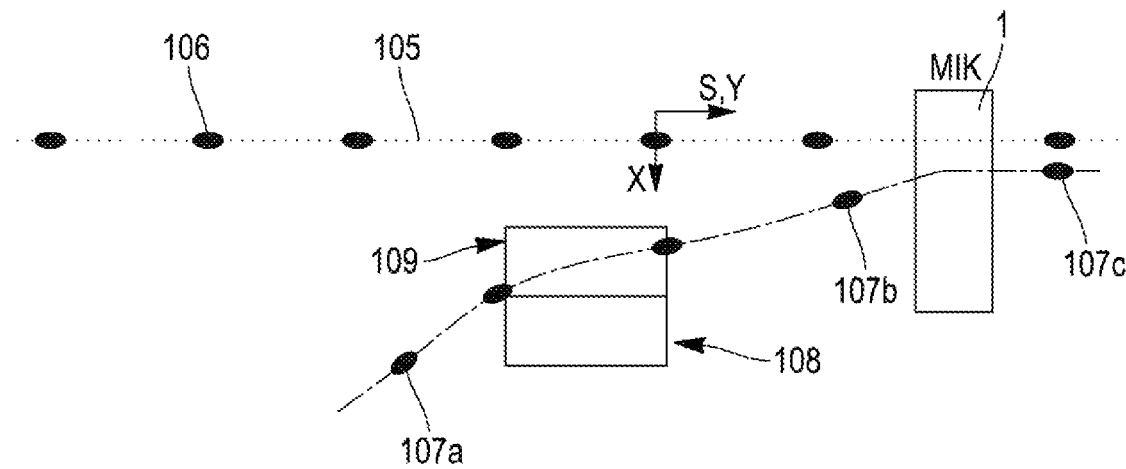
[Fig. 6]
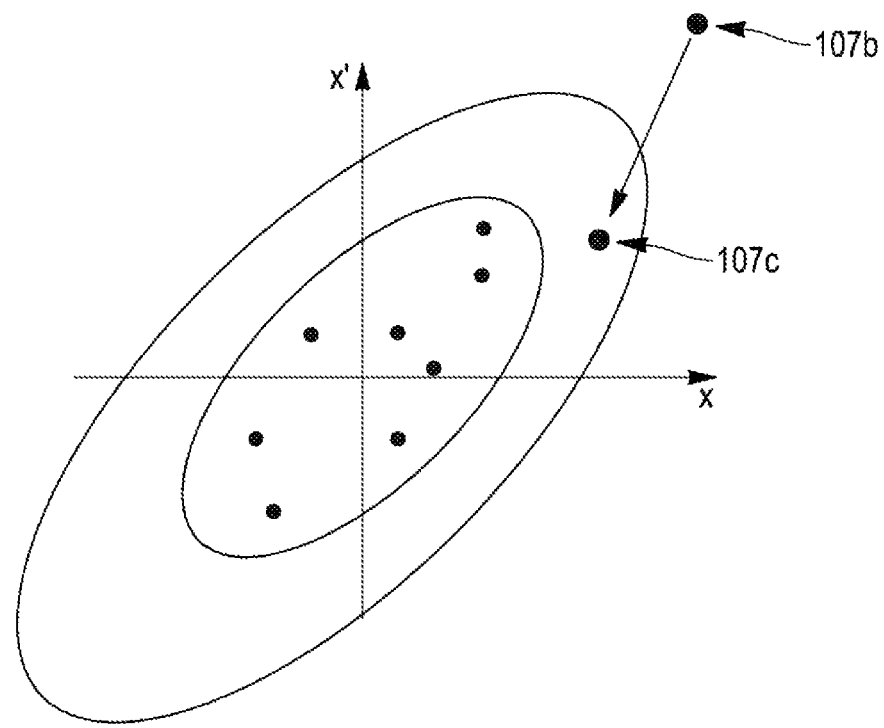

[Fig. 7]
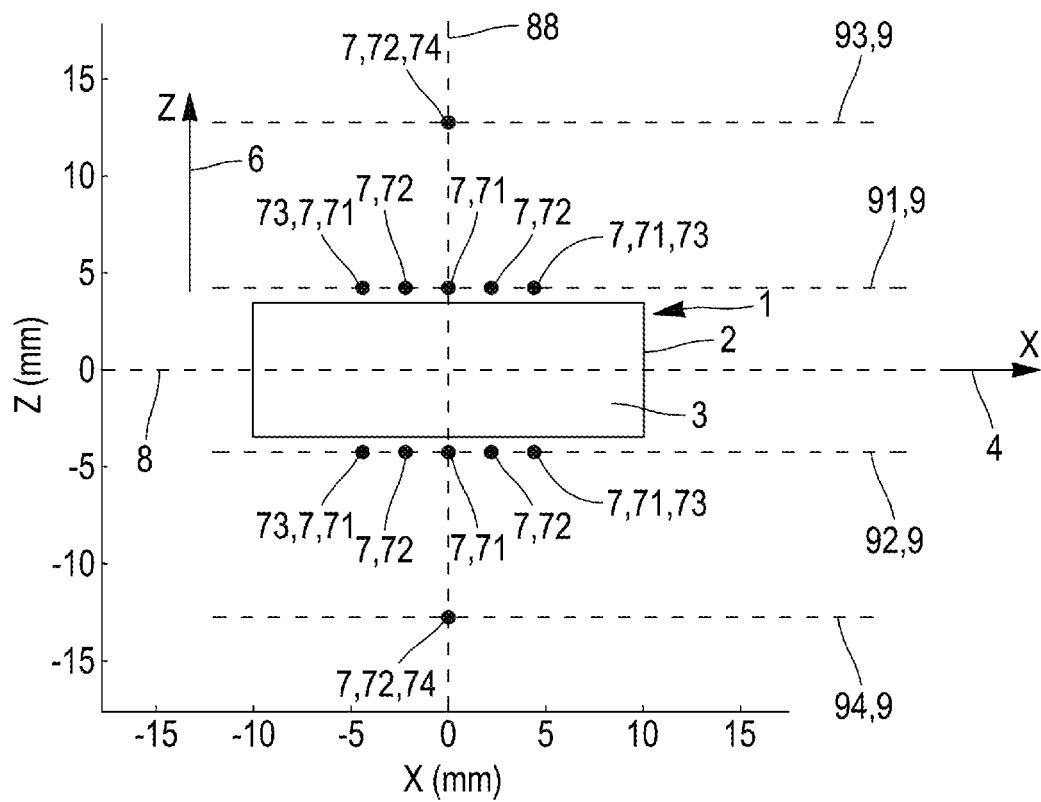
[Fig. 8]
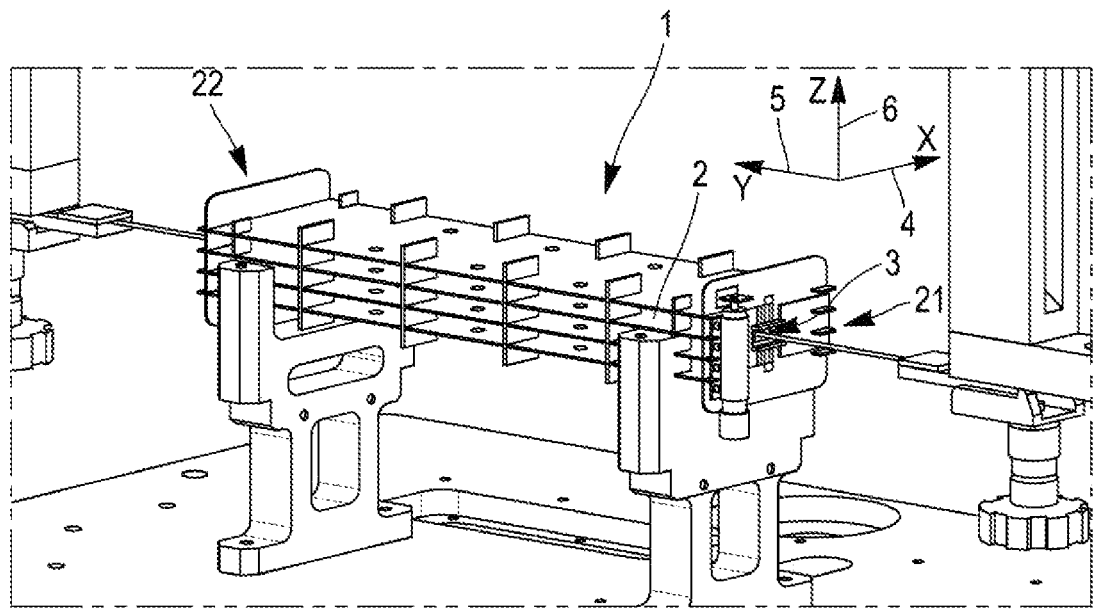

[Fig. 9]
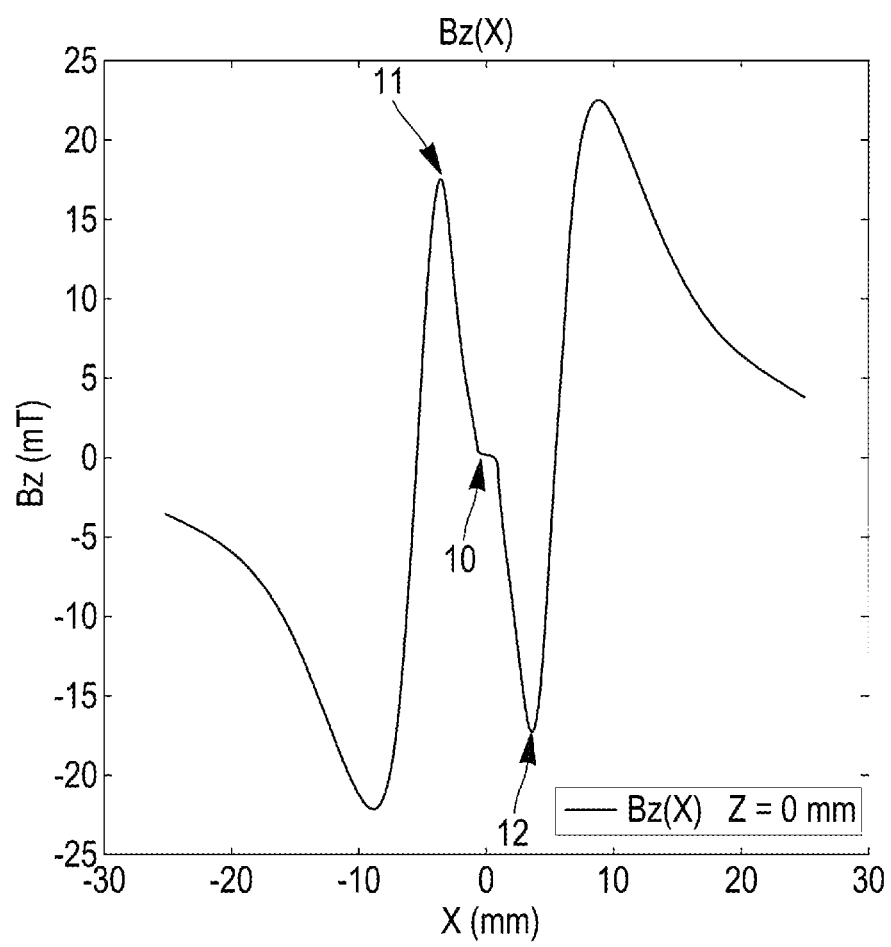

[Fig. 10]

[Fig. 11]
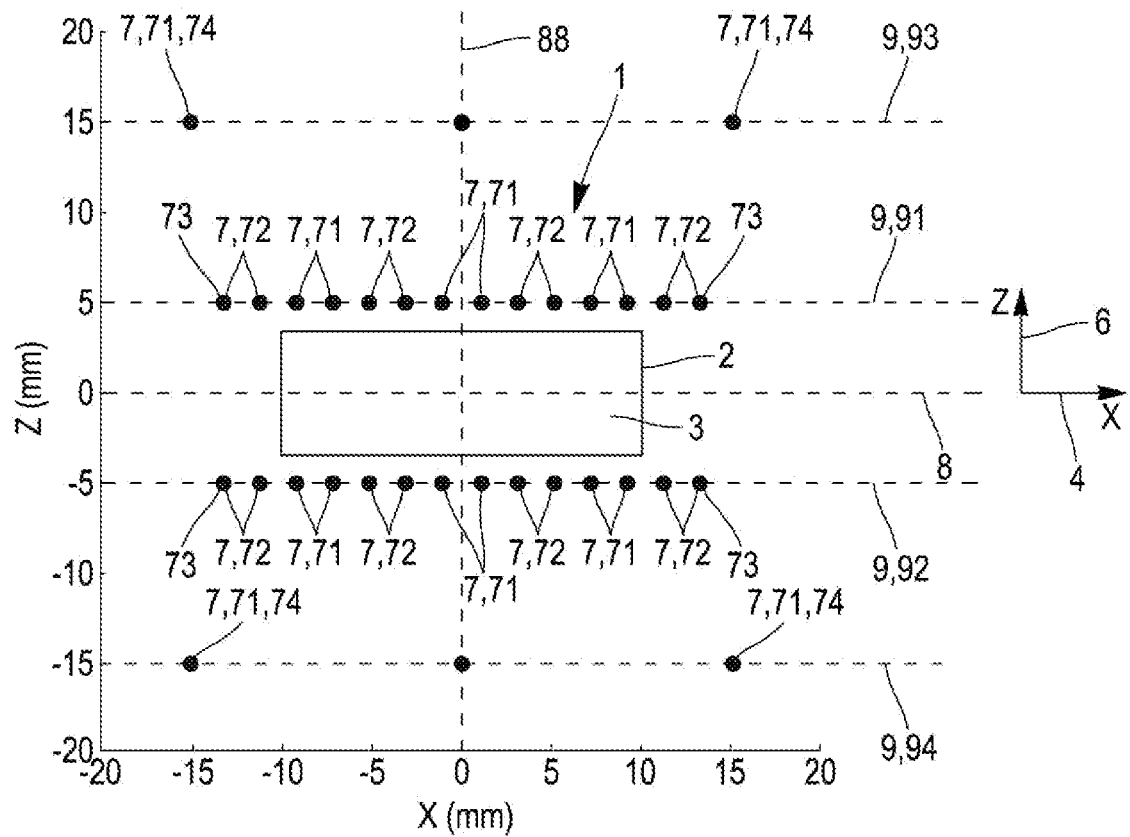
[Fig. 12]
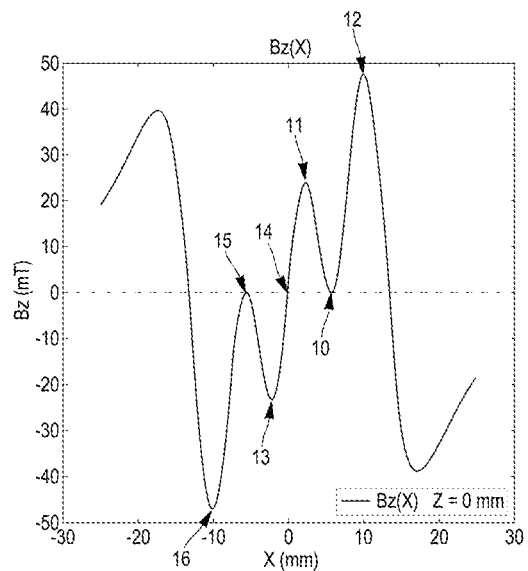

[Fig. 13]

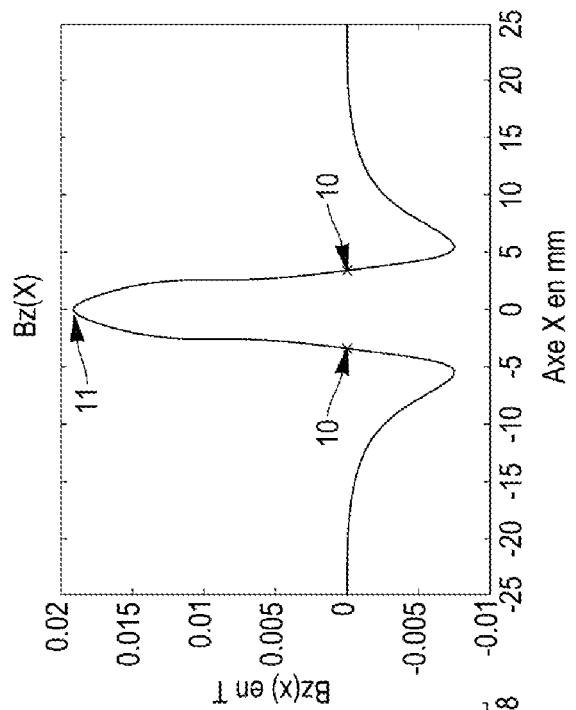
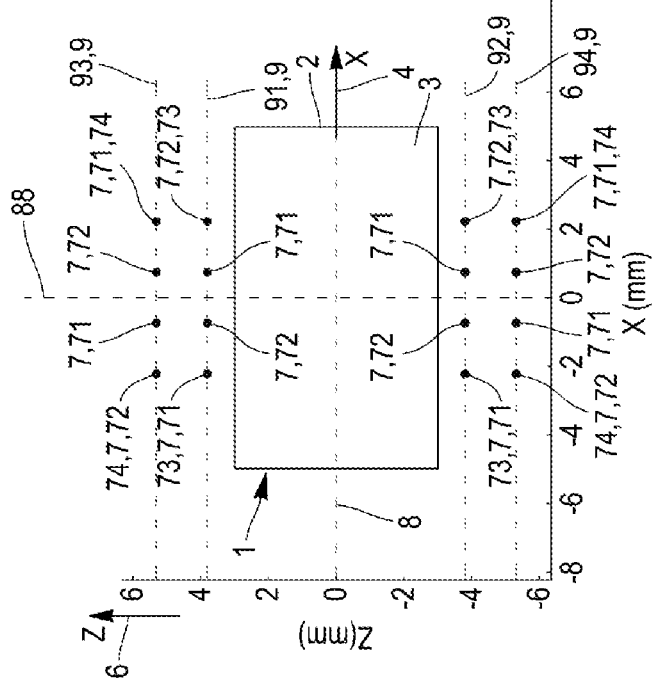
[Fig. 14]
FIG. 14a
FIG. 14b

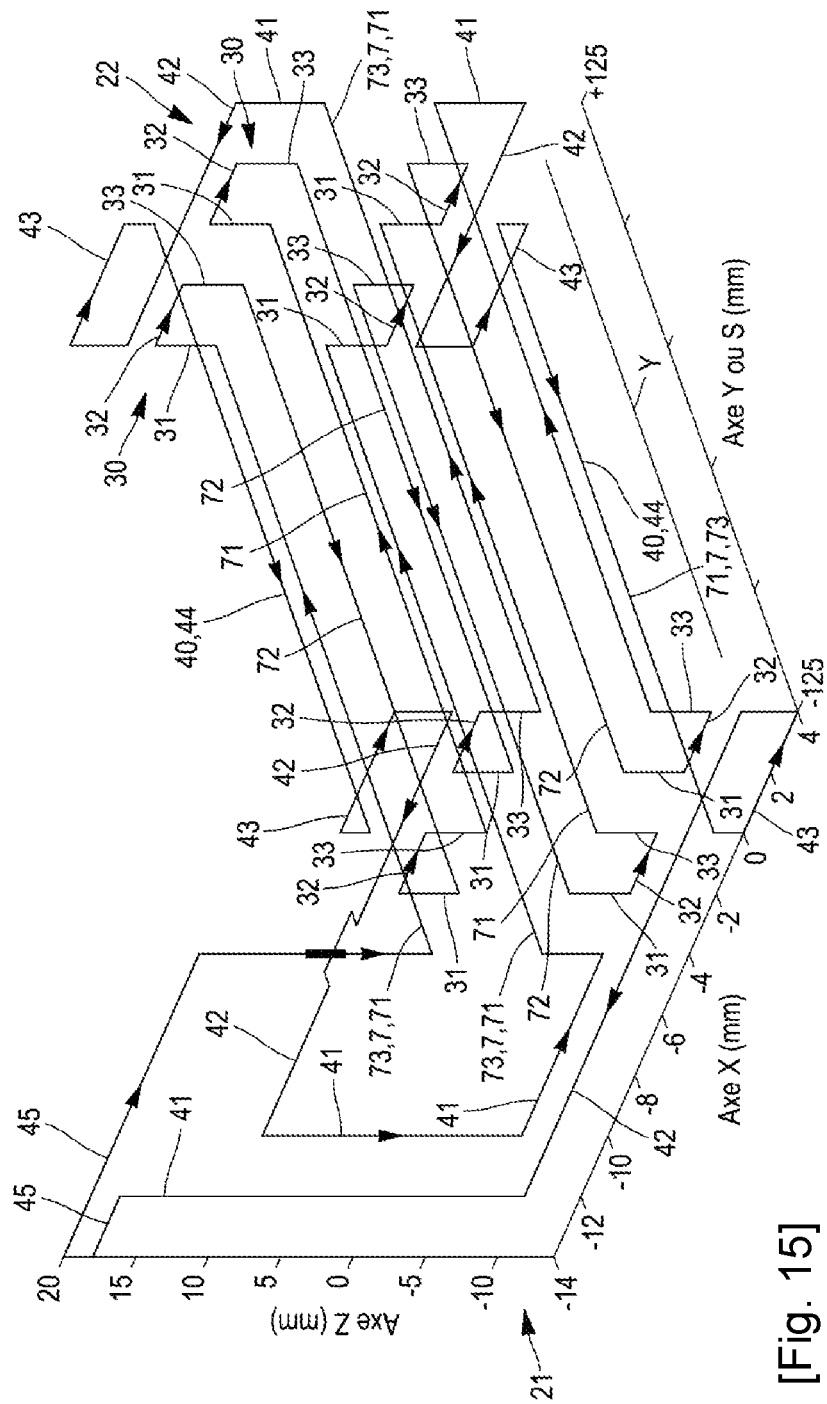
[Fig. 15]

[Fig. 16]
Magnetic field Bz(s) for different positions « x »
Non-optimized intercoil connections
MIK Topology D
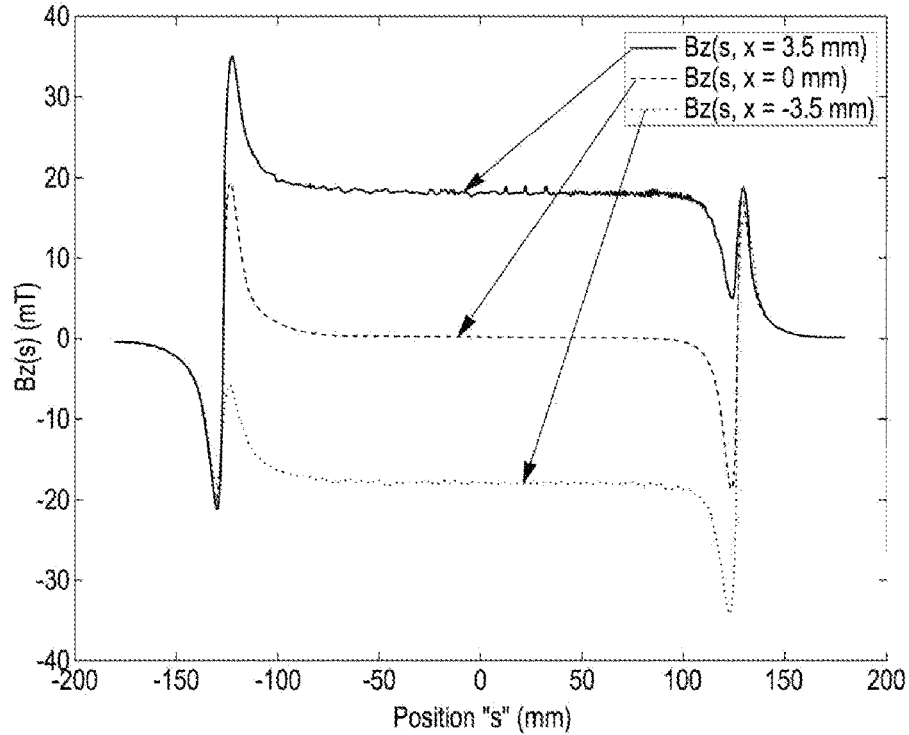
[Fig. 17]
Magnetic field Bz(s) for different positions « x »
Optimized intercoil connections
MIK Topology D
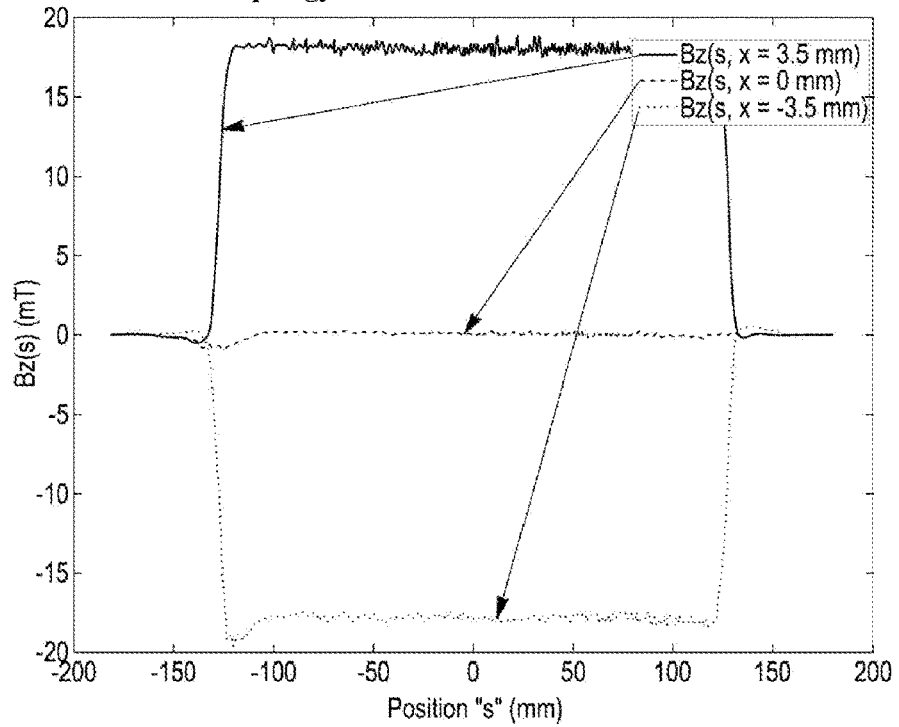

MULTIPOLE ELECTROMAGNET

BACKGROUND

The present invention relates to a multipole electromagnet. It also relates to a method implemented with such an electromagnet.

Such an electromagnet allows a user to generate a magnetic field. The field of the invention is more particularly that of particle accelerators.

With reference to FIG. 1, a synchrotron radiation source is generally composed of a storage ring (SR) in which packets 106 of charged particles circulate continuously. The particles used in the majority of machines in operation throughout the world are electrons. The work energies of these storage rings are generally between 1 and 8 GeV.

A storage ring is constituted by at least of a periodic succession of bending magnets (dipole magnets) and focusing magnets (quadrupole magnets). Magnets of higher order (sextupole magnets, octupole magnets, etc.) are also installed for correcting focusing defects of higher order (chromaticity, for example). This succession of magnets is called a "lattice".

When the electrons are deflected by the bending magnets, they lose a portion of their energy in the form of synchrotron radiation—radiation characterized by a broad spectral range typically extending from the infrared to hard X-rays, and by a high photon flux. This synchrotron radiation is then used by the various laboratories (called beamlines) installed around the storage ring. Synchrotron radiation is also produced starting from other types of magnets called magnetic insertions, generally constituted by a large succession of small dipole magnets.

The packets of electrons stored in the storage ring do not have an infinite lifetime. They are gradually lost owing to two principal phenomena: interactions between electrons (Touschek effect, which is explained hereunder) and collisions with residual gas molecules (since the electrons circulate in chambers at ultrahigh vacuum). To ensure a constant photon flux on the experimental stations of the beamlines, it is therefore important to maintain a constant stream of electrons in the machine.

The process of continuous reinjection is called injection or reinjection that is "continuous in order to keep a stored current practically constant" (also called "top-up" injection hereinafter) and the following conventional scheme in FIG. 1 is utilized in the majority of third-generation storage rings. The block diagram is based on four fast deflecting/diverting magnets 101, 102, 103, 104 (also called kicker magnets 101, 102, 103, 104 hereinafter) and a magnet 108 with a passive septum 109. These kicker magnets 101, 102, 103, 104 are simple dipole electromagnets, generally constituted by a coil with one or two windings in a magnetic circuit of ferrite, supplied with pulsed electric current of semi-sinusoidal or trapezoidal shape. The supply of pulses of current allows the generation of brief magnetic fields and therefore rapid deflection of the electrons, on a few revolutions of a storage ring.

The passive septum magnet 108 is also a dipole electromagnet and its main characteristic is that its transverse magnetic field distribution comprises two zones: a first zone, where the magnetic field is intense to allow final deflection of the injected beams 107 (i.e. the air gap (also called gap) of the magnet), and a very close zone where the magnetic field is almost zero, so as not to disturb the stored beam 106. The separation between the two magnetic field zones is carried out with a physical plate: the septum 109.

The normal trajectory of the stored beam is given along the dotted line 105. During an injection, the four kickers 101, 102, 103, 104 are supplied with pulsed current, thus generating a closed orbit deflection: this is the orbit shown by the dot-and-dash line 106, with the packets already stored. The deflection will make the stored packets "lick" the inside edge of the septum 109.

At the maximum of this closed orbit deflection, the electrons to be injected arrive either from an energy-raising synchrotron ring (ASEE), also called booster ring, or from a linear accelerator (dot-and-dash trajectory of the packets 107) and undergo a final deflection in the gap of the passive septum magnet 108. At the outlet of the passive septum magnet 108, the injected packets 107 are therefore separated from the stored packets 106 by the thickness of the septum 109 (not taking into account the tolerances).

The two last kickers (103 & 104) of course return the beams 106, 107 to the normal axis of the machine. The injected beam 107, which is slightly offset, begins a betatron oscillation at relatively high amplitude around the stored beam 106. The injected beam 107 will then decay turn after turn in the stored beam 106. Thus current is successfully accumulated in a storage ring.

To understand certain drawbacks of the "top-up" injection according to the state of the art, it is necessary to define some parameters of electron beams. The motion of each electron is characterized by 6 quantities:

$$(x; x'; z; z'; s; \delta)$$ [Math 1]

The quantities x, z and s represent the transverse positions of an electron (x and z) and its longitudinal position in the storage ring (s). The quantities x' and z' are the angular divergences of the electron relative to the ideal trajectory (i.e. the projection of the electron velocity vector on the X and Z axes). The letter "delta" is the error in energy of the electron relative to the work energy (or nominal energy) of the storage ring.

Using these parameters, the concept of phase space is often used in order to give representations of the motion of the electrons. For example as illustrated in FIG. 2, the position x is plotted on the y axis and the divergence x', at a given position z and s of the beam, is plotted on the x axis.

Positions and divergences of eight electrons represented by points can be seen in FIG. 2. By extension, when a large number of particles is injected (a packet of electrons typically contains $10^{11}$ electrons), all the stable positions x and x' will be traversed and the contour is therefore obtained (ellipse in FIG. 2) the area of which is called emittance (in this case horizontal) of the electron beam.

Phase spaces are often used for representing the injection mechanisms, as will be described hereunder.

A final important quantity in the study of "top-up" injection schemes is the dynamic aperture. To a first approximation, the dynamic aperture corresponds to the set of stable transverse positions in the storage ring at which an injected beam 107 can be placed. A particle beam injected in these positions will begin a betatron oscillation and will then decay turn after turn in the position of a stored beam.

The stored beam 106 is logically at the centre of the dynamic aperture.

The orbit deflection by the four kickers 101-104 causes the dynamic aperture to shift towards the septum 109.

The injected beam 107 is located in the dynamic aperture in a stable zone.

The stored beam 106 is well located on its centred axis, with the injected beam 107 oscillating around the stored beam 106. In the absence of closed orbit deflection by the four kickers 101-104, the inside edge of the septum 109 is sufficiently distant from the stored beam 106 (typically approximately twenty millimetres): this position does not affect the stored beam 106, owing to the losses of electrons by the Touschek effect: random energy exchanges between the electrons within one and the same packet. Those that have an excessive energy deficit or excess will then oscillate at a larger or smaller amplitude along the storage ring. If the walls of the vacuum chambers (and therefore of the septum, which is a physical barrier) are too close to the packets of electrons, they risk intercepting these "Touschek" particles and therefore it will be necessary to reinject electrons more frequently. The Touschek lifetime is one of the fundamental parameters in the design of storage rings.

The orbit deflection by the four kickers 101-104 is made necessary by the fact that a physical constraint (the septum 109) cannot be left close to the stored beam 106 permanently: beam lifetime would be greatly reduced, as explained above.

In conclusion, for top-up injection with a scheme with four kickers 101-104:
- the stored beam 106 is displaced as close as possible to the septum 109 using an orbit deflection generated by four kicker magnets 101-104,
- the injected beam 107 is brought as close as possible to the stored beam 106 and thus enters the dynamic aperture,
- on reduction of the closed orbit deflection, the two beams 106, 107 come back towards the normal axis of the storage ring, far from the edge of the septum 109.

Typically, generation of the closed orbit deflection by the four kickers 101-104 lasts for several storage ring turns (i.e. several microseconds (µs)) and its reduction lasts just as long.

Based on its mode of operation, this scheme is called "off-axis" (as the injected beam 107 is not injected directly on the axis of the stored beam 106) and "with the work energy of the storage ring (or nominal energy)" ("on-momentum") as the injected beam 107 has the same energy as the stored beam 106.

Drawbacks of the top-up injection scheme in FIG. 1 with kicker magnets 101-102 are as follows:
- a limit of the top-up injection scheme with 4 kicker magnets 101-104 is the deficit of magnetic identity of the magnets. This deficit means that the orbit deflection of the stored beam 106 at the time of injection is not closed perfectly, and consequently the whole of the stored beam 106 oscillates slightly until it stabilizes again after some thousands of revolutions,
- this overall oscillation of the stored beam 106 owing to top-up injection induces an oscillation of the photon flux on the beamlines, which is detrimental for certain experiments requiring a very short acquisition time or intending to analyse nanometric specimens,
- despite the care taken in making and adjusting the kicker magnets 101-104, the best top-up injections prove difficult to obtain from the residual oscillations of the stored beam 106 less than some tens or hundreds of effective micrometres (in the RMS sense), the order of magnitude of the stabilities of stored beams being the micrometre for the existing machines, and less than a micrometre for future machines.

The top-up injection scheme with four kickers 101-104 is no longer necessarily desirable in the new storage rings (4th generation) as the beamlines no longer want to have perturbation of their photon flux owing to reinjection, in particular owing to the new methods of experimentation and instrumentation that require very short acquisition times. Perturbation of the stored beam by the closed orbit deflection by the four kickers 101-104 therefore must no longer exist.

Moreover, it is important to have a relatively large dynamic aperture that would make it possible to contain the stored beam, the thickness of the septum plate and the injected beam (as well as the obvious tolerances). Passive septum magnets with thin septa (1 millimetre or less) are difficult to design as the magnetic stray field constraints, i.e. the residual field in the zone where the stored beam is located, are very severe.

Now, the 4th-generation machines use many magnets of high order with strong magnetic field (sextupoles, octupoles, dodecapoles, etc.), which has the harmful consequence of greatly reducing the dynamic aperture. Despite the non-linear optimizations of these new machines, the advantageous dynamic apertures (where the injection yield exceeds 75%) barely exceed 4 to 5 mm (instead of dynamic apertures between 10 and 40 mm on the existing machines).

An off-axis injection scheme proposed by Bessy II (article entitled "DEVELOPMENT OF A NON-LINEAR KICKER SYSTEM TO FACILITATE A NEW INJECTION SCHEME FOR THE BESSY II STORAGE RING", T. Atkinson et al., Proceedings of IPAC2011, San Sebastian, Spain) uses a multipole kicker magnet (or "multipole injection kicker", MIK). In the literature, the term non-linear kicker (NLK) is also found.

The MIK proposed by Bessy II is constituted by 8 cylindrical conductors 70 placed parallel to the longitudinal axis of a storage ring. A block diagram of this is shown in FIG. 3.

Each of the conductors 70 is placed at the apex of one of two squares the centre of which is placed on the stored beam. These conductors 70 are aligned on two diagonals 881, 882 common to the two squares and which cross at the centre of the chamber 300. In FIG. 3, the external conductors 70, 702 of the larger of the two squares are traversed by a current going in one direction, the internal conductors 70, 701 of the smaller of the two squares being traversed by the same current but in the opposite direction. The conductors are embedded in the vacuum chamber 300 in insulating material. The electrons circulate inside at the centre of this vacuum chamber 300.

The magnet in FIG. 3 generates a priori the magnetic field map in FIG. 4 for a current of 1 kiloampere (1 kA). It can be seen that this vertical magnetic component $B_z$ (along the vertical axis in FIG. 3), which makes it possible to deflect electrons in the horizontal plane, has at its centre a point 100 of zero magnetic field, of interest for the stored beam. Outside this zone, there is the magnetic field that is capable of deflecting off-axis electrons in the dynamic aperture, typically those that would be injected in top-up. Peaks 110, 120 of magnetic field can be seen, where the variation of the field relative to the X axis is slight (peaks), and zones 130 where these variations are greater (strong gradients).

The use of the MIKs seems to be ideal for injection in these new storage rings with a much reduced dynamic aperture.

However, this type of MIK magnet has the following limits or drawbacks.

The first difficulty is due to the injected beams themselves: they are generally generated using a booster, i.e. an accelerator which ramps the electrons from a low energy to the work energy of the storage ring. The lattices of the boosters are generally fairly conventional, which gives the beams to be injected a high horizontal emittance. Typically, the emittance of the beam at booster outlet is for example approximately 140 nm·rad, to be compared to the 4.3 nm·rad of the beam circulating in the storage ring. Concretely, this means that their transverse dimensions are not negligible (the packets are "broad" transversely).

If these injected beams are superposed on the field map of an MIK of the Bessy II type, it will be realized that the zone of greatest interest with respect to the problem of dimensions of the injected beam is the magnetic field peak, located at approximately +/−10 mm. The variations of the magnetic field relative to "X" are the lowest and therefore the majority of the electrons injected would receive good deflection in the dynamic aperture.

Unfortunately, deflection of a beam injected at 10 mm towards the dynamic aperture at the level of the MIK (i.e. a coordinate $xi_{nj}$ below 5 mm) would require a considerable magnetic force that one or even several MIKs would not reasonably be able to generate. The beams at septum outlet must therefore arrive at the MIK closer to the normal axis and inevitably use the magnetic field zones where the gradient is high. As a result, the deflection on an electron packet with strong emittance would not be uniform and therefore a large portion of these electrons would not be injected correctly and would therefore be lost.

Moreover, to maintain a suitable lifetime by the Touschek effect, the septum cannot be introduced further into the storage ring.

Finally, to inject close to the normal axis, it is necessary to generate a sufficiently intense magnetic field (typically some tens of millitesla, at some millimetres from the zero field zone for the stored beam), and consequently a pulsed current of high intensity is needed, typically of some thousands of amperes.

The aim of the present invention is to resolve at least one of the aforementioned drawbacks, and/or to propose an electromagnet:
- limiting and/or avoiding an orbit deflection of the stored beam at the time of injection, which would not be perfectly closed and/or excessively long oscillation of the stored beam before it stabilizes, and/or
- limiting and/or avoiding oscillation of the photon flux that is detrimental for certain experiments requiring a very short acquisition time or seeking to analyse nanometric specimens, and/or
- allowing residual oscillations of the stored beam less than some tens or hundreds of effective micrometres to be obtained,
- allowing more effective deflection of an injected beam, preferably of high emittance, towards a functional dynamic aperture and preferably reduced with a reasonable magnetic force, and/or
- improving the uniformity of deflection on an electron packet with high emittance and/or the quality of injection of these electrons, and/or
- making it possible to maintain a mechanical aperture of the kicker magnet vacuum chamber compatible with the constraints of Touschek lifetime, and/or
- allowing a saving in space or overall dimensions of the electromagnet, in particular relative to solutions with several dipole kicker magnets.

SUMMARY

This aim is achieved with a multipole electromagnet for particle injection, preferably of electrons or positrons, comprising:

- a hollow duct, arranged to transport particles inside its hollow, said hollow extending along a longitudinal axis Y,
- a plurality of wire conductors placed parallel or substantially parallel to the longitudinal axis Y along the duct (preferably connected electrically in series), and arranged to conduct electric current.

Preferably, the direction of the electric current flowing through the wire conductors need not be identical for all the wire conductors.

Preferably, the electromagnet may comprise as many wire conductors conducting electric current in a first direction as wire conductors conducting electric current in a second direction opposite to the first direction.

Preferably, the directions of the electric current flowing through the wire conductors may be symmetric relative to a first plane of symmetry parallel or substantially parallel to the longitudinal axis Y and passing through the hollow.

The wire conductors may be distributed in several carrier planes parallel or substantially parallel to the first plane of symmetry, preferably including two principal carrier planes symmetric relative to the first plane of symmetry and located outside the hollow. Each principal carrier plane may carry wire conductors that conduct the electric current in the first direction and wire conductors that conduct the electric current in the second direction opposite to the first direction.

Each principal carrier plane may carry at least four wire conductors, and preferably carries 4, 5 or 14 wire conductors.

The two principal carrier planes may be a distance apart greater than or equal to 7 mm.

Each principal carrier plane may comprise only wire conductors following one another according to an alternation between respectively one or two wire conductor(s) conducting electric current in the first direction then respectively one or two wire conductor(s) conducting the electric current in the second direction opposite to the first direction.

The carrier planes may further comprise two control carrier planes, symmetric relative to the first plane of symmetry and located outside the hollow so that the principal carrier planes are located between the control carrier planes.

The electromagnet according to the invention may comprise means for displacing the control carrier planes in parallel and/or perpendicularly to the first plane of symmetry.

Each control carrier plane may carry at least or exactly 1, 2 or 4 wire conductors.

Each control carrier plane may comprise wire conductors following one another according to an alternation between respectively one or two wire conductor(s) conducting electric current in the first direction then respectively one or two wire conductor(s) conducting electric current in the second direction opposite to the first direction.

The direction or directions of the electric current flowing through the wire conductors at the ends of the succession of wire conductors carried by the principal carrier planes may be opposite to the direction of the electric current flowing through the wire conductors at the ends of the succession of wire conductors carried by the control carrier planes.

The directions of the electric current flowing through the wire conductors may be symmetric relative to a second plane of symmetry parallel or substantially parallel to the longitudinal axis Y and passing through the hollow, and perpendicular to the first plane of symmetry.

The hollow may have:
- in a direction Z joining the two principal carrier planes, a dimension of at least 6 mm, and/or in a direction X perpendicular to the direction Z and to the longitudinal axis Y, a dimension of at least 6 mm or even of at least 15 mm The wire conductors and their current may be arranged to generate a magnetic field the component Bz(x) of which in a direction Z joining the two principal carrier planes and varying as a function of the coordinate in a direction X perpendicular to the direction Z and to the longitudinal axis Y:

- has a zero value for a zero field position located in the hollow of the duct, preferably located substantially at the centre of a cross-section of the hollow of the duct, and preferably has a field less than 5 microtesla (µT) (preferably 2 µT) preferably over an interval in the direction X of at least 0.05 mm around the zero field position, preferably for an arrangement of the conductors leading to a zero field shape of sextupole or octupole form (making it possible to ensure transparency of the injection with respect to the stored beam), and/or
- has a value with at least one peak, preferably with at least two peaks on either side of the zero field position, of at least 10 millitesla (mT), preferably of at least 15 mT, for a position at a distance A from the zero field position along the direction X and for a peak of electric current of 1 kA in the wire conductors, this magnetic field peak being located in the hollow of the duct, and preferably with A greater than or equal to 3 mm and/or less than or equal to 7 mm (or even less than or equal to 5 mm). The electromagnet according to the invention may comprise means for generating electric current, preferably pulsed (also called pulsed current), flowing through the wire conductors and typically greater than 500 amperes and/or less than 10000 amperes.

The number of wire conductors placed parallel or substantially parallel to the longitudinal axis Y along the duct and connected in series may be greater than or equal to 12.

The number of wire conductors placed parallel or substantially parallel to the longitudinal axis Y along the duct and connected in series may be less than or equal to 32.

The number of wire conductors placed parallel or substantially parallel to the longitudinal axis Y along the duct and connected in series may be equal to 12, 16 or 32.

At each of the two ends of the electromagnet along the longitudinal axis Y, adjacent wire conductors may be connected in pairs by a series connection, this series connection comprising a loop extending in a plane perpendicular to the first plane of symmetry, this closed loop preferably comprising:

- A first part of the loop starting from a first wire conductor of the pair, perpendicularly to the first plane of symmetry
- A third part of the loop joining a second wire conductor of the pair, perpendicularly to the first plane of symmetry
- A second part of the loop joining the first part of the loop to the third part of the loop, parallel or substantially parallel to the first plane of symmetry the second parts of all these loops being, for an end under consideration of the wire conductors, preferably traversed by the electric current in one and the same direction;

moreover, on each of the two sides of the first plane of symmetry, the electromagnet may comprise an auxiliary conductor connecting a wire conductor electrically in series to another wire conductor or to an electrical supply terminal, from a first end of the electromagnet along the longitudinal direction Y to a second end of the electromagnet along the longitudinal direction, this auxiliary conductor comprising, at each of the two ends of the electromagnet along the direction Y, the following parts connected in series in this order:

- A first part connected electrically to a wire conductor or to one of the two electrical supply terminals
- A second part extending parallel or substantially parallel to the first plane of symmetry and arranged to be traversed by an electric current in a direction opposite to the second parts of loops located at the same end of the electromagnet along the longitudinal direction Y, so that these second parts of loops are located between the first plane of symmetry and the second part of the auxiliary conductor,
- Optionally, a third part extending parallel or substantially parallel to the first plane of symmetry and arranged to be traversed by an electric current in one and the same direction as the second parts of loops located at the same end of the electromagnet along the longitudinal direction Y, so that the second part of the auxiliary conductor is located between the first plane of symmetry and the third part of the auxiliary conductor,
- A fourth part joining the two ends of the electromagnet along the longitudinal direction Y.

According to yet another aspect of the invention, a particle accelerator is proposed, preferably of electrons or positrons, comprising a synchrotron radiation source, a storage ring of charged particles circulating in this ring, and an electromagnet according to the invention.

According to yet another aspect of the invention, a method is proposed, implemented in a multipole electromagnet for particle injection comprising:

- A step of transporting particles, preferably of electrons or positrons, inside the hollow of a hollow duct, this hollow extending along a longitudinal axis Y,
- A step of conducting an electric current in a plurality of wire conductors placed parallel or substantially parallel to the longitudinal axis Y along the duct (and preferably connected electrically in series).

The direction of the electric current flowing through the wire conductors need not be identical for all the wire conductors.

The electromagnet may comprise as many wire conductors conducting electric current in a first direction as wire conductors conducting electric current in a second direction opposite to the first direction.

The directions of the electric current flowing through the wire conductors may be symmetric relative to a first plane of symmetry parallel or substantially parallel to the longitudinal axis Y and passing through the hollow.

The wire conductors may be distributed in several carrier planes parallel or substantially parallel to the first plane of symmetry, preferably including two principal carrier planes symmetric relative to the first plane of symmetry and located outside the hollow.

Each principal carrier plane may carry wire conductors that conduct electric current in the first direction and wire conductors that conduct electric current in the second direction opposite to the first direction.

Each principal carrier plane may carry at least four wire conductors, and preferably carries 4, 5 or 14 wire conductors.

The two principal carrier planes may be a distance apart greater than or equal to 7 mm.

Each principal carrier plane may comprise only wire conductors following one another according to an alternation between respectively one or two wire conductor(s)

conducting electric current in the first direction then respectively one or two wire conductor(s) conducting electric current in the second direction opposite to the first direction.

The carrier planes may further comprise two control carrier planes, symmetric relative to the first plane of symmetry and located outside the hollow so that the principal carrier planes are located between the control carrier planes.

The method according to the invention may comprise a displacement, by the displacing means, of the control carrier planes in parallel and/or perpendicularly to the first plane of symmetry.

Each control carrier plane may carry at least or exactly 1, 2 or 4 wire conductors.

Each control carrier plane may comprise wire conductors following one another according to an alternation between respectively one or two wire conductor(s) conducting electric current in the first direction then respectively one or two wire conductor(s) conducting electric current in the second direction opposite to the first direction.

The direction or directions of the electric current flowing through the wire conductors at the ends of the succession of wire conductors carried by the principal carrier planes may be opposite to the direction of the electric current flowing through the wire conductors at the ends of the succession of wire conductors carried by the control carrier planes.

The directions of the electric current flowing through the wire conductors may be symmetric relative to a second plane of symmetry parallel or substantially parallel to the longitudinal axis Y and passing through the hollow, and perpendicular to the first plane of symmetry.

The hollow may have:
in a direction Z joining the two principal carrier planes, a dimension of at least 6 mm, and/or
in a direction X perpendicular to the direction Z and to the longitudinal axis Y, a dimension of at least 6 mm or even of at least 15 mm.

The wire conductors and their current may generate a magnetic field the component $Bz(x)$ of which in a direction Z joining the two principal carrier planes and varying as a function of the coordinate in a direction X perpendicular to the direction Z and to the longitudinal axis Y:
has a zero value for a zero field position located in the hollow of the duct, preferably located substantially at the centre of a cross-section of the hollow of the duct, and preferably has a field less than 5 $\mu$T (preferably 2 $\mu$T) preferably over an interval in the direction X of at least 0.05 mm around the zero field position, preferably for an arrangement of the conductors leading to a zero field shape of sextupole or octupole form (making it possible to ensure transparency of the injection with respect to the stored beam), and/or
has a value with at least one peak, preferably with at least two peaks on either side of the zero field position, of at least 10 mT, preferably of at least 15 mT, for a position at a distance A from the zero field position along the direction X and for a peak of electric current of 1 kA in the wire conductors, this magnetic field peak being located in the hollow of the duct, and preferably with A greater than or equal to 3 mm and/or less than or equal to 7 mm (or even less than or equal to 5 mm) The method according to the invention may comprise generation of the electric current, preferably pulsed, flowing through the wire conductors and typically greater than 500 amperes and/or less than 10000 amperes.

The number of wire conductors placed parallel or substantially parallel to the longitudinal axis Y along the duct and connected in series may be greater than or equal to 12.

The number of wire conductors placed parallel or substantially parallel to the longitudinal axis Y along the duct and connected in series may be less than or equal to 32.

The number of wire conductors placed parallel or substantially parallel to the longitudinal axis Y along the duct and connected in series may be equal to 12, 16 or 32.

At each of the two ends of the electromagnet along the longitudinal axis Y, adjacent wire conductors may be connected in pairs by a series connection, this series connection comprising a loop extending in a plane perpendicular to the first plane of symmetry, this closed loop preferably comprising:
A first part of the loop starting from a first wire conductor of the pair, perpendicularly to the first plane of symmetry
A third part of the loop joining a second wire conductor of the pair, perpendicularly to the first plane of symmetry
A second part of the loop joining the first part of the loop to the third part of the loop, parallel or substantially parallel to the first plane of symmetry the second parts of all these loops being, for an end under consideration of the wire conductors, preferably traversed by the electric current in one and the same direction;
moreover, on each of the two sides of the first plane of symmetry, the electromagnet may comprise an auxiliary conductor connecting a wire conductor electrically in series to another wire conductor or to an electrical supply terminal, from a first end of the electromagnet along the longitudinal direction Y to a second end of the electromagnet along the longitudinal direction, this auxiliary conductor comprising, at each of the two ends of the electromagnet along the direction Y, the following parts connected in series, in this order:
A first part connected electrically to a wire conductor or to one of the two electrical supply terminals
A second part extending parallel or substantially parallel to the first plane of symmetry and arranged to be traversed by an electric current in a direction opposite to the second parts of loops located at the same end of the electromagnet along the longitudinal direction Y, so that these second parts of loops are located between the first plane of symmetry and the second part of the auxiliary conductor,
Optionally, a third part extending parallel or substantially parallel to the first plane of symmetry and arranged to be traversed by an electric current in one and the same direction as the second parts of loops located at the same end of the electromagnet along the longitudinal direction Y, so that the second part of the auxiliary conductor is located between the first plane of symmetry and the third part of the auxiliary conductor,
A fourth part joining the two ends of the electromagnet along the longitudinal direction Y.

BRIEF DESCRIPTION OF THE DRAWINGS

Other advantages and characteristics of the invention will become apparent on reading of the detailed description of implementations and embodiments which are in no way limitative, and the following attached diagrams:
FIG. 1 is a diagrammatic top view of an injection section according to the state of the art,
FIG. 2 illustrates an example of phase space x & x' according to the state of the art,
FIG. 3 illustrates a cross-section of an MIK magnet of the MAX IV type according to the state of the art, FIG. 4 illustrates the magnetic field Bz created by the magnet in FIG. 3 according to the state of the art, for a peak current of 1 kA.

FIG. 5 is a top view of a portion of a particle accelerator comprising an electromagnet 1 according to the invention, FIG. 6 is an example of phase space x & x' of an electromagnet 1 according to the invention, FIG. 7 is a sectional view, perpendicularly to the longitudinal axis Y, of a first embodiment of electromagnet 1 according to the invention, which is the preferred embodiment of the invention, FIG. 8 is a perspective view of the first embodiment of electromagnet 1 according to the invention, FIG. 9 is the magnetic field map Bz(X) for Z=0 and Y=0 generated at 1 kA of the first embodiment in FIG. 7, FIG. 11 is a sectional view, perpendicularly to the longitudinal axis Y, of a second embodiment of electromagnet 1 according to the invention, FIG. 12 is the magnetic field map Bz(X) for Z=0 and Y=0 generated at 1 kA of the second embodiment in FIG. 11, FIG. 14 is, on its part a), a sectional view, perpendicularly to the longitudinal axis Y, of a fourth embodiment of electromagnet 1 according to the invention; and is, on its part b), the magnetic field map Bz(X) for Z=0 and Y=0 generated at 1 kA of the fourth embodiment in FIG. 14a), FIG. 15 is a three-dimensional view of the connectors 7 and of their electrical connections in series for the first embodiment in FIG. 7, FIG. 16 illustrates the vertical magnetic field Bz along the longitudinal axis "S" or Y for different positions X of interest, in the case of non-optimized connections in series between the connectors 7 of the first embodiment in FIG. 7 and therefore different from those illustrated in FIG. 15, FIG. 17 illustrates the vertical magnetic field Bz along the longitudinal axis "S" or Y for different positions X of interest, in the case of the optimized connections in series between the connectors 7 of the first embodiment in FIG. 7 illustrated in FIG. 15.

Figure 13A:
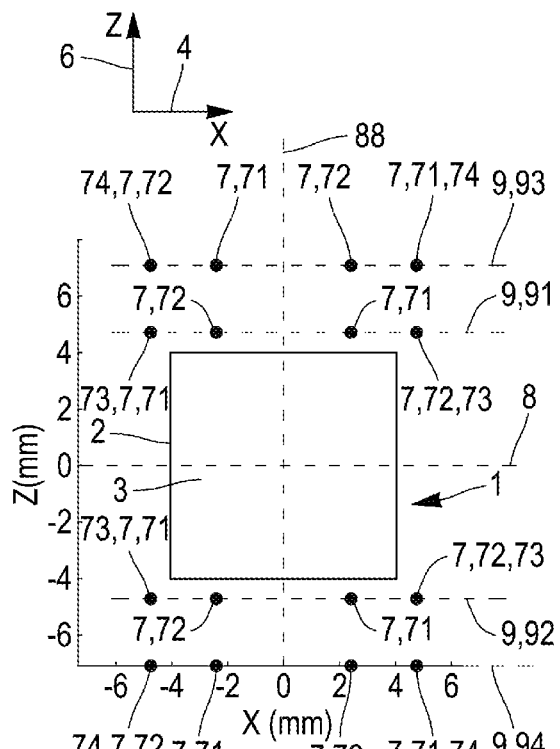
FIG. 13 is, on its part a), a sectional view, perpendicularly to the longitudinal axis Y, of a third embodiment of electromagnet 1 according to the invention; and is, on its part b), the magnetic field map Bz(X) for Z=0 and Y=0 generated at 1 kA of the third embodiment in FIG. 13a)

Each of FIGS. 7, 11, 13a), and 14a) is a sectional view, perpendicularly to the longitudinal axis Y, of an embodiment of electromagnet 1 according to the invention, at the middle of the magnet 1 along the axis Y (i.e. for Y=0).

DETAILED DESCRIPTION

As these embodiments are in no way limitative, variants of the invention could be considered in particular comprising only a selection of the characteristics described or illustrated hereinafter, in isolation from the other characteristics described (even if this selection is isolated within a phrase containing these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention with respect to the state of the prior art.

Firstly, it is noted that a homothetic transformation of an MIK magnet of the Bessy II type according to the state of the art illustrated in FIG. 3, with the aim of bringing back the peaks in FIG. 4 located within plus or minus 10 mm to positions closer to the centre (a few millimetres from the zero field zone for the stored beam), would have the effect of displacing each peak towards the centre of the magnet. Unfortunately, to have this peak in a dynamic aperture between 3 and 5 mm, this means having the conductors 70 practically in contact with the stored beam, which makes no sense.

Modification of the magnet according to the state of the art in FIG. 3 is therefore far from easy or obvious for a person skilled in the art seeking to solve the technical problems forming the basis of the present invention.

A first embodiment of electromagnet 1 according to the invention will now be presented, with reference to FIGS. 5 to 10 and 15 to 17.

As illustrated in FIGS. 7 and 8, this multipole electromagnet 1 for particle injection, preferably of electrons or positrons, comprises:

- a hollow duct 2, arranged to transport particles inside its hollow 3 (preferably at the centre or substantially at the centre of this hollow 3), this hollow 3 (also called "chamber") extending along a longitudinal axis Y also called S and also referenced 5,
- a plurality of wire conductors 7 placed parallel or substantially parallel to the longitudinal axis Y along the duct, connected electrically in series and arranged to conduct electric current.

The conductors referenced 7 comprise only:

main conductors 7, in the principal planes 91, 92 (several main conductors 7, preferably at least four, per plane 91 or 92), and optionally, control conductors 7, in the control planes 93, 94 (at least one control conductor 7 per plane 93 or 94).

A value Y= or y= or S= or s= defines a position along the axis Y or S.

By "substantially parallel" or "substantially in parallel" is meant parallel or in parallel with a potential error of angle of inclination comprised between plus 5 degrees and minus 5 degrees, preferably between plus 1 degree and minus 1 degree.

The conductors 7 are of small section, typically with a radius of 1 mm or less.

The conductors 7 are placed parallel or substantially parallel to the tangent or longitudinal axis "Y" (also called "S") of a storage ring.

FIG. 7 is a sectional view perpendicular to the axis Y, substantially at the centre of the magnet 1 along its elongation along the axis Y.

The length of the duct 2 along the axis Y is typically from 100 to 300 mm, typically 250 mm.

The duct 2 is made of ceramic.

The duct 2 is covered, on its inside surface (i.e. in contact with the interior volume of the chamber 3), with a metallic deposit.

This deposit is electrically conducting.

This deposit is typically of titanium. This deposit allows conduction of the "image current" induced by the circulation of the electron beam at the centre of the chamber 3. It is important firstly to arrange metallized horizontal faces opposite the planes of conductors 91, 92.

The direction of the electric current 71, 72 flowing through the wire conductors 7 is not identical for all the wire conductors 7.

The electromagnet 1 comprises as many wire conductors 7 conducting the electric current in a first direction 71 (in the present description also called "positive direction", with a current density in a conductor 7 oriented in the same direction as the electrons) as there are wire conductors 7 conducting the electric current in a second direction 72 (in the present description also called "negative direction", with a current density oriented in the reverse direction of the electrons) opposite to the first direction.

The directions of the electric current flowing through the wire conductors 7 are symmetric relative to a first plane of symmetry 8 parallel or substantially parallel to the longitudinal axis Y and passing through the hollow 3.

The wire conductors 7 are distributed in several carrier planes 9 parallel or substantially parallel to the first plane of symmetry 8, including:
- two principal carrier planes 91, 92 with symmetrical positions relative to the first plane of symmetry 8 and located outside the hollow 3, each principal carrier plane 91, 92 carrying main wire conductors 7 that conduct the electric current in the first direction 71 and wire conductors 7 that conduct the electric current in the second direction 72 opposite to the first direction,
- two control carrier planes 93, 94, with symmetrical positions relative to the first plane of symmetry 8 and located outside the hollow 3 so that the principal carrier planes 91, 92 are located between the control carrier planes 93, 94, each control carrier plane 93, 94 carrying at least one control conductor 7.

The wire conductors 7 of each of the planes 91, 92 are distributed with a spatial periodicity along the direction X or the axis X.

The wire conductors 7 of each of the planes 93, 94 are distributed with a spatial periodicity along the direction X or the axis X.

In contrast to the state of the art (FIG. 3), the conductors 7 generating the magnetic field in the chamber 3 are not carried solely by two diagonals 881, 882 of a square (or of a rectangle).

The conductors 7 have a rectangular section of 500 µm×135 µm (track of conventional printed circuit ("PCB")). In a variant, the conductors 7 are cylindrical with a diameter of 400 µm.

In the present document, a conductor 7 is said to be carried or distributed in a plane as soon as at least one straight segment (preferably parallel to the axis Y and/or preferably perpendicular to the constant section, preferably circular or rectangular, of this conductor 7) is located entirely inside the conductor 7 in question and is also located in this plane, optionally with a tolerance of position typically less than +/−0.1 mm.

Each principal carrier plane 91, 92 carries at least four wire conductors 7, and in this embodiment carries 5 wire conductors 7.

The two principal carrier planes 91, 92 are a distance apart (along the direction Z perpendicular to Y) greater than or equal to 7 mm.

Each principal carrier plane 91, 92 comprises only wire conductors 7 following one another according to an alternation between respectively one or two wire conductor(s) 7 conducting electric current in the first direction 71 then respectively one or two wire conductor(s) 7 conducting electric current in the second direction 72 opposite to the first direction.

More precisely, each principal carrier plane 91, 92 comprises only wire conductors 7 following one another according to an alternation between respectively a wire conductor 7 conducting electric current in the first direction 71 then respectively a wire conductor 7 conducting electric current in the second direction 72 opposite to the first direction.

The electromagnet 1 comprises motor-driven means (not illustrated) for displacing the control carrier planes 93, 94 parallel and/or perpendicular to the first plane of symmetry 8.

Each control carrier plane 93, 94 carries at least one (and in the case of this embodiment exactly one) wire conductor 7.

The directions of the electric current flowing through the wire conductors 7, 73 at the ends of the succession of wire conductors 7 carried by the principal carrier planes 91, 92 is opposite to the direction of the electric current flowing through the wire conductor 7, 74 carried by each of the control carrier planes 93, 94.

The directions of the electric current flowing through the wire conductors 7 are symmetric relative to a second plane of symmetry 88 parallel or substantially parallel to the longitudinal axis Y and passing through the hollow 3 and perpendicular to the first plane of symmetry 8.

The hollow 3 has:
- in a direction or vertical axis Z (also referenced 6) joining the two principal carrier planes 91, 92 (i.e. perpendicular to the two principal planes 91, 92), a dimension of at least 6 mm,
- in a direction or horizontal axis X (also referenced 4) perpendicular to the direction Z and to the longitudinal axis Y, a dimension of at least 6 mm or even of at least 15 mm.

A value Z= or z= defines a position along the direction or the axis Z.

A value X= or x= defines a position along the direction or the axis X.

The electromagnet 1 comprises means (not illustrated) for generating the electric current flowing through the wire conductors 7, this current being:
- preferably pulsed (the pulsed character is possibly recommended by two factors: it is preferable for the electromagnet 1 to be switched off before passage by the injected beam 107 after a revolution in the storage ring. Then, as it is necessary to have high currents to obtain the desired magnetic fields Bz, it is preferable to use pulsed currents, otherwise there would be a risk of destruction of the magnet 1), and
- greater than 500 amperes (and preferably less than 10000 amperes: the limitations on peak current are due to heating of the magnet (melting effect of the conductors 7), the inductance of the magnet 1 and its stability at the high voltage induced by the pulsed character).

The number of wire conductors 7 placed parallel or substantially parallel to the longitudinal axis Y along the duct 2 and connected in series is greater than or equal to 12.

The number of wire conductors 7 placed parallel or substantially parallel to the longitudinal axis Y along the duct 2 and connected in series is less than or equal to 32.

The number of wire conductors 7 placed parallel or substantially parallel to the longitudinal axis Y along the duct 2 and connected in series is equal to 12.

This embodiment therefore comprises 12 conductors 7.

These conductors are arranged in 2 sets (one set per plane 91 or 92) of several (five) conductors 7 parallel or substantially parallel (and coplanar) and 2 sets (one set per plane 93, 94) of at least one (exactly one) external conductor 7, called control conductor. The length of the magnet 1 is typically 250 mm.

The detailed structural characteristics of this embodiment are as follows:
- length of the conductors 7 along the axis Y: 250 mm (but may vary depending on the desired length)
- aperture of the chamber 3 along the direction or the axis X: 20 mm (but may vary depending on the requirements)
- aperture of the chamber 3 along the direction or the axis Z: at least 6 mm, preferably 8 mm
- spatial periodicity of the conductors 7 in each of the planes 91, 92 along the direction or the axis X: 2.337 mm
- spatial periodicity of the conductors 7 in each of the planes 93, 94 along the direction or the axis X: Not applicable
- distance between the planes 91 and 92 along the direction or the axis Z: 8.308 mm
- distance between the planes 91 and 93 along the direction or the axis Z, for at least one position of the means for displacing the planes: 8.536 mm
- course of each of the planes 93 and 94 along the direction or the axis Z and/or the axis X: at least 1 mm, typically 2 mm The point X=0 and Z=0 is regarded as the centre of the hollow 3, i.e. the centre of the disk forming its circular section (perpendicularly to Y) or the intersection of the diagonals of the rectangle forming its rectangular section (perpendicularly to Y).

The stored 106 and injected 107 beams are typically at Z=0.

The stored beam 106 is at X=0.

With reference to FIG. 9, the wire conductors 7 and their current 71, 72 are arranged to generate a magnetic field the component Bz(X) of which in the direction Z (joining the two principal carrier planes 91, 92 and perpendicular to the principal planes 91, 92) and varying as a function of the coordinate in the direction X perpendicular to the direction Z and to the longitudinal axis Y:
- has a zero value for a zero field position 10 located in the hollow 3 of the duct, preferably located at the centre (X=0, Z=0) or substantially at the centre (i.e. preferably Z=0 (or −1 mm<Z<1 mm) and −7 mm<X<7 mm) of a cross-section (perpendicularly to Y) of the hollow 3 of the duct, and has a field less than 5 µT (preferably 2 µT) on an interval in the direction X of at least 0.05 mm around the zero field position (making it possible to ensure transparency of the injection with respect to the stored beam) for this embodiment having a zero field shape of the octupole type, and
- has a value with at least one peak, preferably with at least two peaks on either side of the zero field position, of at least 10 mT, preferably of at least 15 mT, for a position 11, 12 at Z=0 and at a distance A from the zero field position along the direction or the axis X and for a peak of electric current of 1 kA in the wire conductors, this magnetic field peak being located in the hollow of the duct, and preferably with A greater than or equal to 3 mm and/or less than or equal to 7 mm (or even less than or equal to 5 mm).

By "Peak of Bz(x)" is meant a position of the field Bz(x) for which:
- the derivative $d(Bz(X))/dX=0$
- the second derivative $d^2(Bz(X))/dX^2 < 0$ if $Bz(X) > 0$
- the second derivative $d^2(Bz(X))/dX^2 > 0$ if $Bz(X) < 0$ The component Bz(X) has, for the zero field position 10, preferably a course that is:
- quadrupole (at Bz(X) locally proportional to X to the first order at the zero field position 10), or
- sextupole (at Bz(X) locally proportional to $X^2$ to the first order at the zero field position 10), or
- octupole (at Bz(X) locally proportional to $X^3$ to the first order at the zero field position 10).

The component Bz(X) has, for the zero field position 10, preferably a sextupole course or a course of higher magnetic order.

In the present embodiment, Bz(X) has, for the zero field position 10, an octupole course.

As illustrated in FIG. 9, the zero of magnetic field 10 of octupole form is found at X=0 mm. The peaks 11, 12 for injection in the context of our specifications are located at X=+/−3.5 mm.

The more distant peaks at X=+/−8.8 mm are not usable for specifications with a small dynamic aperture but might be suitable for other storage rings. By homothetic transformation of this topology, the smallest peak-zero transition would also be 3 mm, with a reduction of the beam aperture to 6 mm vertically.

The two control conductors 7 of the planes 93 and 94 only serve to refine the shape of the zero of magnetic field, they do not significantly alter the position of the peak at 3.5 mm of the magnetic field map.

As described above, this embodiment of electromagnet 1 comprises two control conductors 7 (on the planes 93 and 94) that make it possible to control the shape of the magnetic field at the centre (dipole and quadrupole value), without significantly affecting the overall distribution of magnetic field Bz: the magnetic field peak is always positioned at 3.5 mm.

Figure 10A:
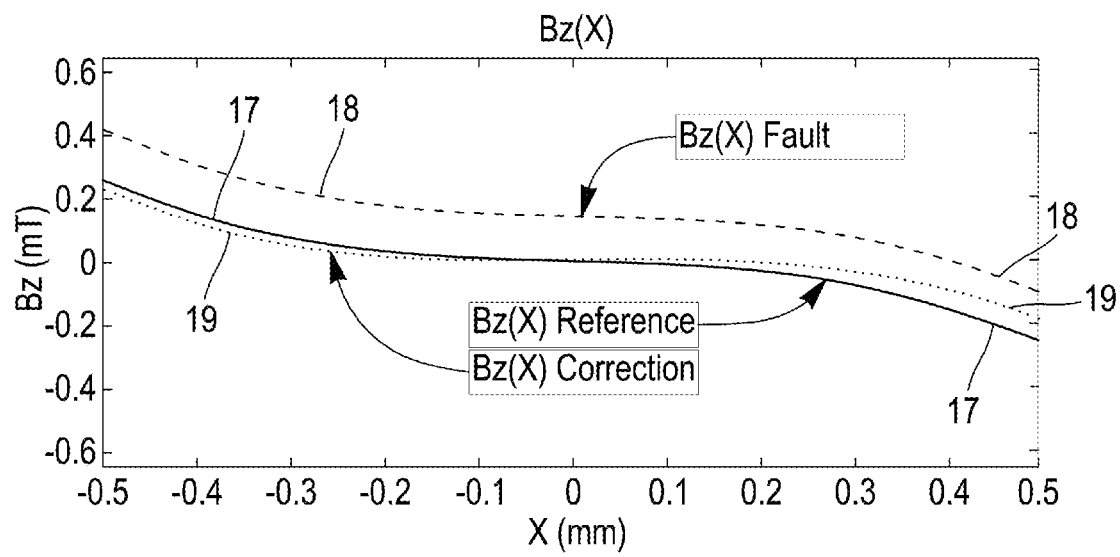
FIG. 10 illustrates, for the first embodiment of electromagnet 1 according to the invention: on its part a), the superposition of the fields Bz(X) (ideal 17, before correction 18 and then after correction 19) zoomed at the centre of the chamber 3 (Z=0, Y=0); on its part b), the superposition of the fields Bx(X) (ideal 170, before correction 180 and then after correction 190) zoomed at the centre of the chamber 3 (Z=0, Y=0)

To illustrate this control, it is assumed in FIGS. 10a) and 10b) that the five coplanar conductors 7 of the upper half magnet of the plane 91 are no longer perfectly parallel to the five lower conductors 7 of the plane 92, which remain in their nominal positions. That is, the five upper conductors 7 have a rotation relative to the conductor 7 C1 (the one at the centre of the five) of 0.6 degrees, which represents a typical error of installation of the magnet.

FIG. 10a) shows the superposition of the reference field Bz 17 (i.e. with an ideal magnet without mechanical faults), the field Bz 18 with the mechanical faults ("Bz(X) Fault") and the field Bz 19 corrected by displacement of the control conductors 7 of the planes 93 and 94 ("Bz(X) Correction").

It can be seen that the superposed curves are almost identical. The peaks at 3.5 mm are not affected overall by these mechanical faults.

In FIG. 10a), we focus on the field Bz at the centre of the magnet, at the location of the stored beam (X=0 mm). The defective field Bz before correction reveals a large dipole defect (approximately 200 µT). The correction makes it possible to regain a level of magnetic field practically identical to the reference field Bz.

It is noted that for this exercise, the top conductors 7 of the plane 93 and bottom of the plane 94 were only displaced respectively in a single direction: the top conductor 7 of the plane 93 could only be displaced in the direction or the vertical axis Z and the bottom conductor 7 of the plane 94 could only be displaced in the direction or the horizontal axis X.

Achievement of this correction required a displacement of the top conductor 7 of the plane 93 of 0.5 mm (vertically according to Z) and of the bottom conductor 7 of the bottom plane 94 of −0.1 mm (horizontally according to X).

Figure 10B:
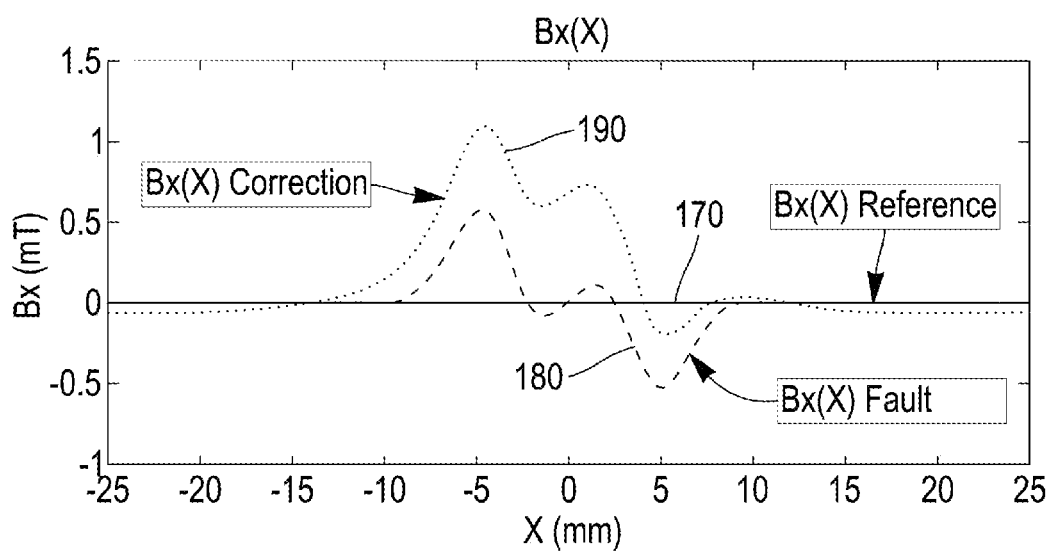

Thus, fixing the degrees of freedom allows quick correction of the field Bz. As a result, with reference to FIG. 10b), the other component Bx in the direction or the axis X of the field is degraded by this correction. FIG. 10b) shows the superposition of the reference field Bx 170 (i.e. with an ideal magnet without mechanical faults), the field Bx 180 with the mechanical faults and the field Bx 190 corrected by displacement of the control conductors 7 of the planes 93 and 94 ("Bz(X) Correction").

However, Bz and Bx can also be corrected jointly with displacement of the control conductors 7 in all the vertical Z and horizontal X directions for each of these control conductors 7.

At each end 21, 22 of the magnet 1 along Y, the conductors 7 are connected in pairs to form a single electric circuit. The (pulsed) electric current is therefore identical in all the conductors 7.

This magnet 1 is supplied with a pulse of electric current of 1 kA.

As illustrated in FIG. 15, at each of the two ends 21, 22 of the electromagnet 1 along the longitudinal axis Y, adjacent wire conductors 7 are connected in pairs by a series connection, this series connection comprising a loop 30 extending in a plane perpendicular to the first plane of symmetry 8, this closed loop 30 comprising:

A first part 31 of the loop starting from a first wire conductor 7 of the pair, perpendicularly to the longitudinal axis Y and to the plane 8

A third part 33 of the loop joining a second wire conductor 7 of the pair, perpendicularly to the longitudinal axis Y and to the plane 8

A second part 32 of the loop joining the first part 31 of the loop to the third part 33 of the loop, parallel or substantially parallel to the direction or the axis X and to the plane 8 the second parts 32 of all these loops 30 being, for a given end 21 or 22 of the wire conductors 7, traversed by the electric current in one and the same direction. It is also noted that the second parts 32 of all these loops 30 are, for the set of the two ends 21 and 22, traversed by the electric current in one and the same direction.

On each of the two sides of the first plane of symmetry 8, the electromagnet 1 comprises an auxiliary conductor 40 connecting a wire conductor 7 electrically in series to another wire conductor 7 or to one of two electrical supply terminals 45, from a first end 21 or 22 respectively of the electromagnet 1 along the longitudinal direction Y to a second end 22 or 21 respectively of the electromagnet 1 along the longitudinal direction Y, this auxiliary conductor 40 comprising, at each of the two ends 21, 22 of the electromagnet 1 along the direction Y, the following parts connected in series in this order:

a first part 41 connected electrically to a wire conductor 7 or to one of the two terminals 45 and extending preferably perpendicularly to the first plane of symmetry 8 a second part 42 extending parallel or substantially parallel to the direction or the axis X and to the plane 8 and arranged to be traversed by an electric current in a direction opposite to the second parts 32 of loops located at the same end 21 or 22 of the electromagnet 1 along the longitudinal direction Y, so that these second parts 32 of loops are located between the first plane of symmetry 8 and the second part 42 of the auxiliary conductor 40, optionally, a third part 43 extending parallel or substantially parallel to the direction or the axis X and to the plane 8 and arranged to be traversed by an electric current in one and the same direction as the second parts 32 of loops located at the same end 21 or 22 of the electromagnet 1 along the longitudinal direction Y, so that the second part 42 of the auxiliary conductor 40 is located between the first plane of symmetry 8 and the third part 43 of the auxiliary conductor 40, a fourth or last part 44 joining the two ends 21, 22 of the electromagnet along the longitudinal direction Y, more precisely joining a second 42 or third 43 part of auxiliary conductor 40 at the end 21 to a second 42 or third 43 part of auxiliary conductor 40 at the other end 22.

The parts 41, 42, 43 and 44 may be connected together in series by intermediate parts, but only by intermediate parts parallel or substantially parallel to the direction or the axis Z.

This arrangement makes it possible to minimize the generation of the parasitic magnetic fields (Bx along X, Bz along Z and Bs=By along S or Y) by the series connections between the conductors 7; these parasitic magnetic fields may perturb the stored beam and therefore reduce the transparency of injection.

FIG. 16 illustrates, in a case for which the non-optimized connections of loops 30 between the conductors 7 would be contained flat in each of the planes 91, 92, 93 and 94, the vertical magnetic field Bz in the direction or the axis Z as a function of the longitudinal coordinate "S" or Y for different positions X of interest, namely positions of the injected beams 107 at X=+3.5 mm and X=−3.5 mm and position of the stored beam at X=0 mm (Z=0 in all cases). The magnet 1 extends from Y=−125 mm to Y=+125 mm. Owing to this simple manner of connection between conductors 7, unwanted parasitic peaks of magnetic field Bz are generated on the stored beam (X=0 mm), which would affect the transparency of the top-up injection mode (i.e. the stored beam 106 must not suffer any perturbation connected with the reinjection of beams). Peaks are also found at the positions of the injected beams (X=+/−3.5 mm), which is not very desirable.

With reference to FIG. 17, we again plot the three curves Bz(s) with the same positions X as for the non-optimized case in FIG. 16, but this time in the case of the optimized connections between conductors 7 as illustrated in FIG. 15. It can be seen that on the stored beam (X=0 mm), the residual field is minimized considerably relative to the initial case. At the level of the injected beams 107, we find a longitudinal magnetic field profile of better quality, with peaks of much lower amplitude.

As illustrated in FIG. 9, the electromagnet 1 according to this first embodiment therefore makes it possible to generate a magnetic field peak Bz close to the axis (typically from 3 to 4 mm relative to the current requirements), with a zero field at the sextupole or octupole profile centre and with a free vertical aperture of vacuum chamber acceptable for the new machines (minimum 6 mm).

The electromagnet 1 is therefore an MIK:
the peak 11 and/or 12 of magnetic field Bz of which is in the dynamic aperture (between 3 and 5 mm), leaving a sizeable aperture for the stored beam 106 (typically 6 mm (vertical Z)×6 to 15 mm (horizontal X))

generating a sufficient deflection of the injected beam (typically 1 to 3 mrad, preferably 1 mrad+1/−0.5 mrad for a nominal beam energy of 2.75 GeV+/−6%)

maintaining a zero or almost zero magnetic field Bz at the centre of the magnet 1 so as not to perturb the stored beam.

With reference to FIG. 9, it can be seen that the magnetic field variations relative to the transverse position X are large, which is the intended aim for magnets of this type. We may therefore place the stored beam 106 at X=0 mm, and place the injected beam 107 at X=+/−3.5 mm, where there is a small local magnetic field peak.

For the stored beam 106 it is obviously advantageous to have a zero magnetic field Bz (in this case with an octupole form). For the injected beam 107 it is advantageous to have a peak 11, 12 of magnetic field Bz, at a fixed distance from the stored beam 106. The peak value (approximately 18 mT) for the injected beam 107 is advantageous, in view of the need to have a rapid progression of the non-field zone (stored beam) at the strong and "flat" field zone for the injected beam.

The fact that the number of conductors 7 is reduced is interesting, because for an equivalent magnetic induction, we have a lower inductance of the magnet, still appreciable in the field of pulsed systems.

As illustrated in FIG. 5, which is a top view of an injection section using the magnet 1 in a 4th generation storage ring, it can be seen that this solution gives a saving of space relative to a cross-section provided with four kicker magnets.

As illustrated in FIG. 6, relative to injection with four kickers, the magnet 1 manages to deflect the injected beam 107 directly in the dynamic aperture without having to deflect the stored beam 106 with the aid of a closed orbit deflection.

FIG. 6 shows the phase space x and x', to which the dynamic aperture is added. At the outlet of septum 109, the injected beam 107b is again temporarily outside of the dynamic aperture. Of course, if nothing is done, it will not be captured by the dynamic aperture and therefore will quickly be lost. The MIK magnet 1 will therefore deflect the injected beam, so that the latter is captured in this dynamic aperture in position 107c. Starting from there, the latter will undergo a betatron oscillation and will decay in the beam already stored.

Since the MIK referenced 1 does not perturb the stored beam 106 (as it does not generate a magnetic field at the centre of the magnet 1), this type of injection ensures excellent transparency of the top-up injection process.

The magnet 1 generates a magnetic field, one of the components of which, Bz—i.e. the vertical magnetic field—makes it possible to deflect onto a stable trajectory injected electron beams 107 coming from a booster without perturbing the packets of electrons 106 already circulating on their normal trajectory in the storage ring. A transparent top-up injection is thus obtained, i.e. the flow of stored electrons is kept constant by regular injection of "fresh" packets of electrons without notable perturbation on the stored electron beam and therefore on the beams of photons produced for the beamlines.

A second embodiment of electromagnet 1 according to the invention will now be presented, with reference to FIGS. 11 and 12.

Only its differences relative to the first embodiment in FIGS. 5 to 10 and 15 to 17 will be described.

As illustrated in FIG. 11, each principal carrier plane 91, 92 carries 14 wire conductors 7.

Each principal carrier plane 91, 92 comprises only wire conductors 7 following one another according to an alternation between respectively two wire conductors 7 conducting electric current in the first direction 71 then respectively one or two wire conductors 7 conducting electric current in the second direction 72 opposite to the first direction.

Each control carrier plane 93, 94 carries exactly 2 wire conductors 7.

Each control carrier plane 93, 94 comprises wire conductors 7 conducting electric current only in the first direction 71.

The number of wire conductors 7 placed parallel or substantially parallel to the longitudinal axis Y along the duct and connected in series is equal to 32.

This embodiment therefore comprises 32 conductors 7 arranged in 2 sets of 14 conductors 7 parallel or substantially parallel (and coplanar) and 4 external conductors 7, called control conductors. The length of the magnet is typically 250 mm.

The direction 72 of the electric current flowing through the wire conductors 7, 73 at the ends of the succession of wire conductors 7 carried by the principal carrier planes 91, 92 is opposite to the direction 71 of the electric current flowing through the wire conductors 7, 74 at the ends of the succession of wire conductors 7 carried by the control carrier planes 93, 94.

As illustrated in FIG. 12, the stored beam 106 does not pass through the geometric centre of the magnet 1. The magnet 1 is displaced in the direction or the axis X so that its zero of magnetic field 10 coincides with the position of stored beam 106.

The zeroes 10, 15 of magnetic field of sextupole form are found at X=+/−5.82 mm (references 10 and 15). The peaks (references 11 and 13) for injection in the context of our specifications are located at X=+/−2.32 mm, i.e. an effective peak-zero transition of 3.5 mm is obtained, as specified. The magnet 1 is offset relative to the stored beam 106 but this is not troublesome a priori; the reference 10 may be shifted at X=0 if, relative to FIG. 12, the conductors 7 are shifted relative to chamber 3 parallel or substantially parallel to X.

The two peaks 11 and 12 are exploitable for the zero of the reference 10.

The other peaks 13, 16 are also exploitable, as a function of the zero field position 10, 14 or 15 used.

As the control conductors 7 only serve for refining the form of the magnetic field zero, they do not alter the "rollercoaster" structure of the magnetic field map. Fine adjustment of the magnetic field zero by fine displacement of these control conductors 7 makes it possible finally to improve the transparency of the top-up injection to compensate the mechanical faults in manufacture of the magnet.

In the present embodiment, Bz(X) has a sextupole course for the zero field position 10.

In the present embodiment, Bz(X) has a sextupole course for the zero field position 15.

In the present embodiment, Bz(X) has a quadrupole course for the zero field position 14.

By homothetic transformation of this topology, the smallest peak-zero transition would be 3 mm.

With reference to FIG. 12, it can be seen that the magnetic field variations relative to the transverse position X are large, which is the required aim for magnets of this type. We may therefore place the stored beam at X=+/−5.82 mm (where the magnetic field Bz is zero), and place the injected beam at +/−2.32 mm where there is a small local peak of magnetic field Bz.

For the stored beam 106 it is obviously advantageous to have a zero magnetic field Bz (in this case with a sextupole form). For the injected beam 107 it is advantageous to have a magnetic field peak Bz, at a fixed distance from the stored beam 106. The peak value (a little over 20 mT) for the injected beam 107 is of interest, taking into account the need to have a rapid progression of the non-field zone (stored beam 106) at the strong and "flat" field zone for the injected beam 107.

The separation between stored 106 and injected 107 beam is 3.5 mm and this is therefore one of the motivations for designing these new magnets 1.

The other peak 12 (at 48 mT) is not easily exploitable as it is, since the distance separating the peak of the magnetic field zero is 4.1 mm. However, magnet 1 can be modified by homothetic transformation and/or rotation of conductors 7 for the best possible exploitation of this peak, to the detriment of the physical aperture for passage of the beams.

Relative to the embodiment in FIG. 7, the embodiment in FIG. 11, owing to its increased number of conductors 7, will generate considerable inductance, detrimental to the pulsed operation of the magnet: it will therefore preferably require increased high voltages (typically of at least 6 kV or 10 kV), which will make its mechanical design more complex.

The detailed structural characteristics of this embodiment are as follows:
length of the conductors 7 along the axis Y: 250 mm (but may vary depending on the desired length)
aperture of the chamber 3 along the direction or the axis X: 20 mm (but may vary depending on the requirements)
aperture of the chamber 3 along the direction or the axis Z: at least 6 mm, preferably 8 mm
spatial periodicity of the conductors 7 in each of the planes 91, 92 along the direction or the axis X: 2.046 mm
spatial periodicity of the conductors 7 in each of the planes 93, 94 along the direction or the axis X: 30.88 mm
distance between the planes 91 and 92 along the direction or the axis Z: 10.234 mm
distance between the planes 91 and 93 along the direction or the axis Z, for at least one position of the means for displacing the planes: 10.323 mm
course of each of the planes 93 and 94 along the direction or the axis Z and/or the axis X: at least 1 mm, typically 2 mm A third embodiment of electromagnet 1 according to the invention will now be presented, with reference to FIG. 13.

Only its differences relative to the first embodiment in FIGS. 5 to 10 and 15 to 17 will be described.

As illustrated in FIG. 13*a*), each principal carrier plane 91, 92 carries 4 wire conductors 7.

Each principal carrier plane 91, 92 comprises only wire conductors 7 following one another according to an alternation between a wire conductor 7 conducting electric current in the first direction 71 then respectively a wire conductor 7 conducting electric current in the second direction 72 opposite to the first direction.

Each control carrier plane 93, 94 carries exactly 4 wire conductors 7.

Each control carrier plane 93, 94 comprises wire conductors 7 following one another according to an alternation between a wire conductor 7 conducting electric current in the first direction 71 and then a wire conductor 7 conducting electric current in the second direction 72 opposite to the first direction.

The direction 71 of the electric current flowing through the wire conductors 7, 73 at the ends of the succession of wire conductors 7 carried by the principal carrier planes 91, 92 is opposite to the direction 72 of the electric current flowing through the wire conductors 7, 74 at the ends of the succession of wire conductors 7 carried by the control carrier planes 93, 94.

The number of wire conductors 7 placed parallel or substantially parallel to the longitudinal axis Y along the duct and connected in series is equal to 16.

The directions of the electric current flowing through the wire conductors 7 are antisymmetric relative to the plane 88 parallel or substantially parallel to the longitudinal axis Y and passing through the hollow 3 and perpendicular to the first plane of symmetry 8.

Figure 13B:
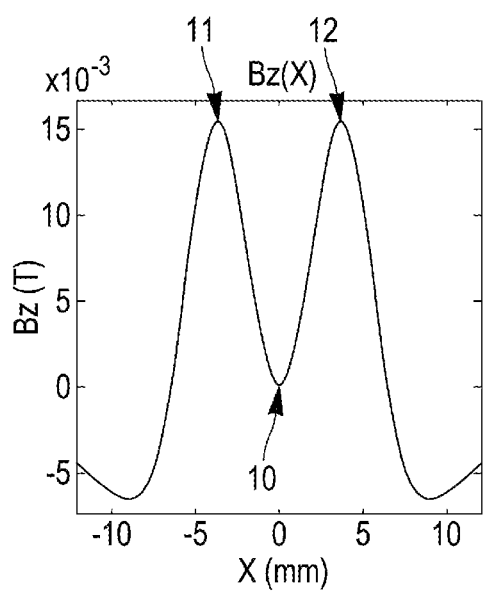

As illustrated in FIG. 13*b*), in the present embodiment, Bz(X) has a sextupole course for the zero field position 10.

The detailed structural characteristics of this embodiment are as follows:
length of the conductors 7 along the axis Y: 250 mm (but may vary depending on the desired length)
aperture of the chamber 3 along the direction or the axis X: 20 mm (but may vary depending on the requirements)
aperture of the chamber 3 along the direction or the axis Z: at least 6 mm, preferably 8 mm
spatial periodicity of the conductors 7 in each of the planes 91, 92 along the direction or the axis X: 2.286 mm
spatial periodicity of the conductors 7 in each of the planes 93, 94 along the direction or the axis X: 2.286 mm
distance between the planes 91 and 92 along the direction or the axis Z: 9.542 mm
distance between the planes 91 and 93 along the direction or the axis Z, for at least one position of the means for displacing the planes: 2.286 mm
course of each of the planes 93 and 94 along the direction or the axis Z and/or the axis X: at least 1 mm, typically 2 mm A fourth embodiment of electromagnet 1 according to the invention will now be presented, with reference to FIG. 14.

Only its differences relative to the embodiment in FIG. 13 will be described.

In the present embodiment, Bz(X) has a quadrupole course for the zero field position 10.

Furthermore, this embodiment only comprises a single peak 11 of at least 10 mT.

In contrast to the preceding embodiments, the wire conductors 7 of each of the planes 91, 92 are not distributed with a spatial periodicity along the direction X or the axis X.

In contrast to the preceding embodiments, the wire conductors 7 of each of the planes 93, 94 are not distributed with a spatial periodicity along the direction X or the axis X.

The detailed structural characteristics of this embodiment illustrated in FIG. 14*a*) are as follows:
length of the conductors 7 along the axis Y: 250 mm (but may vary depending on the desired length)
aperture of the chamber 3 along the direction or the axis X: 20 mm (but may vary depending on the requirements)
aperture of the chamber 3 along the direction or the axis Z; at least 6 mm, preferably 8 mm spatial position of the conductors 7 in each of the planes 91, 92 along the direction or the axis X: each of the two conductors 7 closest to the plane 88 is located at 0.7448 mm from the plane 88; each of the two conductors 7 farthest from the plane 88 is located at 2.234 mm from the plane 88, the magnet 1 being symmetric relative to the plane 88 for the positions of its conductors 7 and antisymmetric relative to the plane 88 for the orientation of the currents in these conductors 7.

spatial position of the conductors 7 in each of the planes 93, 94 along the direction or the axis X: each of the two conductors 7 closest to the plane 88 is located at 0.7448 mm from the plane 88; each of the two conductors 7 farthest from the plane 88 is located at 2.234 mm from the plane 88, the magnet 1 being symmetric relative to the plane 88 for the positions of its conductors 7 and antisymmetric relative to the plane 88 for the orientation of the currents in these conductors 7.

distance between the planes 91 and 92 along the direction or the axis Z: 7.612 mm distance between the planes 91 and 93 along the direction or the axis Z, for at least one position of the means for displacing the planes: 1.489 mm course of each of the planes 93 and 94 along the direction or the axis Z and/or the axis X: at least 1 mm, typically 2 mm As illustrated in FIG. 14b), it has the advantage of managing to generate a true plateau of magnetic field Bz (with a zero or substantially zero spatial derivative on about 1 mm), with a distance A between the centre of the plateau 11 and the zero magnetic field point 10 of 3.5 mm.

We will now describe, with reference to FIG. 6, a particle accelerator according to the invention, preferably of electrons or positrons, comprising a synchrotron radiation source, a storage ring of charged particles 106 circulating in this ring, and an electromagnet 1 according to any one of the embodiments described above and arranged for injection of new particles 107 in the ring.

We will now describe an embodiment of the method according to the invention implemented in any one of the embodiments of electromagnet 1 or particle accelerator described above.

This method comprises generation of the electric current, preferably pulsed, flowing through the wire conductors 7 and typically greater than 500 amperes and/or less than 10000 amperes.

This method comprises:
a step of transporting particles, preferably electrons or positrons, inside the hollow 3 of the hollow duct 2, this hollow extending along the longitudinal axis Y 5,
a step conducting the electric current in the plurality of wire conductors 7 placed parallel or substantially parallel to the longitudinal axis Y along the duct, and connected electrically in series.

The direction of the electric current 71, 72 flowing through the wire conductors 7 is not identical for all the wire conductors 7.

The electromagnet 1 comprises as many wire conductors 7 conducting electric current in the first direction 71 as wire conductors 7 conducting electric current in the second direction 72 opposite to the first direction.

The directions of the electric current flowing through the wire conductors 7 are symmetric relative to the first plane of symmetry 8 parallel or substantially parallel to the longitudinal axis Y and passing through the hollow 3.

The wire conductors 7 are distributed in several carrier planes 9 parallel or substantially parallel to the first plane of symmetry 8, the two principal carrier planes 91, 92 of which are symmetric relative to the first plane of symmetry 8 and located outside the hollow 3, each principal carrier plane 91, 92 carrying wire conductors 7 that conduct the electric current in the first direction 71 and wire conductors 7 that conduct the electric current in the second direction 72 opposite to the first direction.

The method comprises a displacement, by the displacing means, of the control carrier planes 93, 94 in parallel and/or perpendicularly to the first plane of symmetry 8 along X and/or Z.

The wire conductors 7 and their current generate a magnetic field the component Bz(X) of which in a direction Z joining the two principal carrier planes 91, 92 and varying as a function of the coordinate in a direction X perpendicular to the direction Z and to the longitudinal axis Y and as described above according to the embodiment under consideration, and in particular:

has a zero value for a zero field position 10 located in the hollow of the duct, preferably located substantially at the centre of a cross-section (perpendicularly to Y) of the hollow 3 of the duct 2, and has a field less than 5 µT (preferably 2 µT) on an interval in the direction X of at least 0.05 mm around the zero field position, for an arrangement of the conductors 7 leading to a zero field shape of sextupole or octupole form (making it possible to ensure transparency of the injection with respect to the stored beam), and has a value with at least one peak, preferably with at least two peaks on either side of the zero field position 10, of at least 10 mT, preferably of at least 15 mT, for at least one position 11, 12 at a distance A from the zero field position 10 along the direction or the axis X and for a peak of electric current of 1 kA in the wire conductors, this peak position 11, 12 of magnetic field being located in the hollow 3 of the duct 2, and preferably with A greater than or equal to 3 mm and/or less than or equal to 7 mm (or even less than or equal to 5 mm)

Of course, the invention is not limited to the examples which have just been described and numerous adjustments can be made to these examples without exceeding the scope of the invention.

Of course, the various characteristics, forms, variants and embodiments of the invention can be combined with one another in various combinations, to the extent that they are not incompatible or mutually exclusive.

The invention claimed is:

1. A multipole electromagnet for particle injection, preferably of electrons or positrons, comprising:
a hollow duct having a hollow, arranged to transport particles inside said hollow, said hollow of said hollow duct extending along a longitudinal axis Y;
a plurality of wire conductors placed parallel to the longitudinal axis Y along the duct, connected electrically in series and arranged to conduct electric current the direction of the electric current flowing through the wire conductors not being identical for all of the wire conductors;
the multipole electromagnet comprising as many wire conductors conducting electric current in a first direction as wire conductors conducting electric current in a second direction opposite to the first direction;
the directions of the electric current flowing through the wire conductors being symmetric relative to a first plane of symmetry parallel to the longitudinal axis and passing through the hollow of the hollow duct; the wire conductors are distributed in several carrier planes parallel to the first plane of symmetry, including two principal carrier planes symmetric relative to the first plane of symmetry and located outside the hollow of the hollow duct; each principal carrier plane carrying wire conductors that conduct electric current in the first direction and wire conductors that conduct electric current in the second direction opposite to the first direction.

2. The multipole electromagnet according to claim 1, characterized in that each principal carrier plane carries at least four wire conductors.

3. The multipole electromagnet according to claim 1, characterized in that the two principal carrier planes are a distance apart greater than or equal to 7 mm.

4. The multipole electromagnet according to claim 1, characterized in that each principal carrier plane comprises only wire conductors following one another according to an alternation between respectively one or two wire conductor(s) conducting electric current in the first direction then respectively one or two wire conductor(s) conducting electric current in the second direction opposite to the first direction.

5. The multipole electromagnet according to claim 1, characterized in that the carrier planes further comprise two control carrier planes, symmetric relative to the first plane of symmetry and located outside the hollow of the hollow duct so that the principal carrier planes are located between the control carrier planes.

6. The multipole electromagnet according to claim 5, characterized in that it comprises means for displacing the control carrier planes in parallel and/or perpendicularly to the first plane of symmetry.

7. The multipole electromagnet according to claim 5, characterized in that each control carrier plane carries at least or exactly 1, 2 or 4 wire conductors.

8. The multipole electromagnet according to claim 5, characterized in that each control carrier plane comprises wire conductors following one another according to an alternation between respectively one or two wire conductor(s) conducting electric current in the first direction then respectively one or two wire conductor(s) conducting electric current in the second direction opposite to the first direction.

9. The multipole electromagnet according to claim 5, characterized in that the direction of the electric current flowing through the wire conductors at the ends of the succession of wire conductors carried by the principal carrier planes is opposite to the direction of the electric current flowing through the wire conductors at the ends of the succession of wire conductors carried by the control carrier planes.

10. The multipole electromagnet according to claim 1, characterized in that the directions of the electric current flowing through the wire conductors are symmetric relative to a second plane of symmetry parallel to the longitudinal axis Y and passing through the hollow of the hollow duct, and perpendicular to the first plane of symmetry.

11. The multipole electromagnet according to claim 1, characterized in that the hollow of the hollow duct has
  in a direction Z joining the two principal carrier planes, a dimension of at least 6 mm,
  in a direction X perpendicular to the direction Z and to the longitudinal axis Y, a dimension of at least 6 mm.

12. The multipole electromagnet according to claim 1, characterized in that the wire conductors and their current are arranged to generate a magnetic field the component $B_z(X)$ of which in a direction Z joining the two principal carrier planes and varying as a function of the coordinate in a direction X perpendicular to the direction Z and to the longitudinal axis Y:
  has a zero value for a zero field position located in the hollow of the hollow duct, preferably located substantially at the centre of a cross-section of the hollow of the hollow duct, and has a field less than 51 µT, and
  has a value with at least one peak, preferably with at least two peaks on either side of the zero field position, of at least 10 mT, preferably of at least 15 mT, for a position at a distance A from the zero field position along direction X and for a peak of electric current of 1 kA in the wire conductors, said magnetic field peak being located in the hollow of the hollow duct, and preferably with A greater than or equal to 3 mm and/or less than or equal to 7 mm.

13. The multipole electromagnet according to claim 1, characterized in that it comprises means for generating electric current, preferably pulsed, flowing through the wire conductors and greater than 500 amperes and/or less than 10000 amperes.

14. The multipole electromagnet according to claim 1, characterized in that the number of wire conductors placed parallel to the longitudinal axis along the duct and connected in series is greater than or equal to 12.

15. The multipole electromagnet according to claim 1, characterized in that the number of wire conductors placed parallel to the longitudinal axis along the duct and connected in series is less than or equal to 32.

16. The multipole electromagnet according to claim 1, characterized in that the number of wire conductors placed parallel to the longitudinal axis along the duct and connected in series is equal to 12, 16 or 32.

17. The multipole electromagnet according to claim 1, characterized in that, at each of the two ends of the multipole electromagnet along the longitudinal axis Y, adjacent wire conductors are connected in pairs by a series connection, said series connection comprising a loop extending in a plane perpendicular to the first plane of symmetry, said closed loop comprising:
  A first part of the loop starting from a first wire conductor of the pair, perpendicularly to the first plane of symmetry;
  A third part of the loop connecting a second wire conductor of the pair, perpendicularly to the first plane of symmetry;
  A second part of the loop connecting the first part of the loop to the third part of the loop, parallel to the first plane of symmetry;
the second parts of all these loops being, for an end under consideration of the wire conductors, traversed by the electric current in one and the same direction and further characterized in that, on each of the two sides of the first plane of symmetry, the multipole electromagnet comprises an auxiliary conductor connecting a wire conductor electrically in series to another wire conductor or to an electrical supply terminal, from a first end of the multipole electromagnet along the longitudinal direction Y to a second end of the multipole electromagnet along the longitudinal direction, said auxiliary conductor comprising, at each of the two ends of the multipole electromagnet along the direction Y, the following parts connected in series, in this order:
  A first part connected electrically to a wire conductor or to one of the two electrical supply terminals;
  A second part extending parallel to the first plane of symmetry and arranged to be traversed by an electric current in an opposite direction to the second parts of loops located at the same end of the multipole electromagnet along the longitudinal direction Y, so that these second parts of loops are located between the first plane of symmetry and the second part of the auxiliary conductor;

a third part extending parallel to the first plane of symmetry and arranged to be traversed by an electric current in one and the same direction as the second parts of loops located at the same end of the multipole electromagnet along the longitudinal direction Y, so that the second part of the auxiliary conductor is located between the first plane of symmetry and the third part of the auxiliary conductor;

A fourth part joining the two ends of the multipole electromagnet along the longitudinal direction Y.

18. A particle accelerator, preferably of electrons or positrons, comprising a synchrotron radiation source, a storage ring of charged particles circulating in said ring, and a multipole electromagnet according to claim 1.

19. A method used in a multipole electromagnet for particle injection comprising:

A step of transporting particles, preferably electrons or positrons, inside a hollow of a hollow duct, said hollow of the hollow duct extending along a longitudinal axis Y; A step of conducting an electric current in a plurality of wire conductors placed parallel to the longitudinal axis Y along the duct, and connected electrically in series;

the direction of the electric current flowing through the wire conductors not being identical for all of the wire conductors;

the multipole electromagnet comprising as many wire conductors conducting electric current in a first direction as wire conductors conducting electric current in a second direction opposite to the first direction;

the directions of the electric current flowing through the wire conductors being symmetric relative to a first plane of symmetry parallel to the longitudinal axis and passing through the hollow of the hollow duct, the wire conductors are distributed in several carrier planes parallel to the first plane of symmetry, including two principal carrier planes symmetric relative to the first plane of symmetry and located outside the hollow of the hollow duct of each principal carrier plane carrying wire conductors that conduct electric current in the first direction and wire conductors that conduct electric current in the second direction opposite to the first direction.

* * * * *